(12) United States Patent
Komura et al.

(10) Patent No.: US 8,270,261 B2
(45) Date of Patent: *Sep. 18, 2012

(54) THERMALLY-ASSISTED MAGNETIC RECORDING HEAD COMPRISING WAVEGUIDE WITH INVERTED-TRAPEZOIDAL SHAPE

(75) Inventors: Eiji Komura, Tokyo (JP); Tsutomu Chou, Tokyo (JP); Koji Shimazawa, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 242 days.

This patent is subject to a terminal disclaimer.

(21) Appl. No.: 12/683,041

(22) Filed: Jan. 6, 2010

(65) Prior Publication Data

US 2011/0164479 A1 Jul. 7, 2011

(51) Int. Cl.
  *G11B 11/00* (2006.01)
(52) U.S. Cl. .................. 369/13.33; 369/13.13
(58) Field of Classification Search .......... 369/13.33, 369/13.13, 13.32, 13.02, 112.09, 112.14, 369/112.21, 112.27; 360/59; 385/129, 31, 385/88–94; 250/201.3, 201.5
  See application file for complete search history.

(56) References Cited

U.S. PATENT DOCUMENTS

| 6,649,894 B2 | 11/2003 | Matsumoto et al. |
| 6,768,556 B1 | 7/2004 | Matsumoto et al. |
| 7,330,404 B2 | 2/2008 | Peng et al. |
| 7,454,095 B2 | 11/2008 | Baehr-Jones et al. |
| 7,898,759 B2 | 3/2011 | Matsumoto et al. |
| 8,000,178 B2 | 8/2011 | Shimazawa et al. |
| 2008/0151431 A1 | 6/2008 | Tanaka et al. |
| 2008/0204916 A1 | 8/2008 | Matsumoto et al. |
| 2008/0239541 A1 | 10/2008 | Shimazawa et al. |
| 2011/0110202 A1* | 5/2011 | Komura et al. ............ 369/13.56 |
| 2011/0116349 A1* | 5/2011 | Komura et al. ............ 369/13.33 |
| 2011/0164479 A1 | 7/2011 | Komura et al. |
| 2011/0176398 A1* | 7/2011 | Tanaka et al. ............. 369/13.33 |
| 2011/0216634 A1* | 9/2011 | Chou et al. ................ 369/13.24 |

FOREIGN PATENT DOCUMENTS

| JP | A-2004-273021 | 9/2004 |
| JP | A-2006-004577 | 1/2006 |
| JP | A-2008-111845 | 5/2008 |

(Continued)

OTHER PUBLICATIONS

Kretschmann et al.; "Radiative Decay of Non Radiative Surface Plasmons Excited by Light;" *Z. Neturforsch.*; 1968; pp. 2135-2136; vol. 23a.

(Continued)

*Primary Examiner* — Tan X Dinh
(74) *Attorney, Agent, or Firm* — Oliff & Berridge, PLC

(57) ABSTRACT

Provided is a thermally-assisted magnetic recording head comprising a near-field-light-generating (NFL-generating) optical system with an improved light use efficiency. The head comprises a magnetic pole, a waveguide propagating a light for exciting surface plasmon, and a NF-optical device configured to emit NF-light from its end surface located adjacent to the magnetic pole end surface. The waveguide cross-section, taken by a plane perpendicular to a waveguide edge along elongated direction, has substantially a trapezoidal shape in which a longer side of opposed parallel sides is an edge of the cross-section on the NF-optical device side. This configuration enables a coupled portion of the NF-optical device which is coupled with the light to be placed in the effective distribution range of the light seeping from the waveguide. Consequently, there can be realized a sufficiently strong coupling between the light seeping from the waveguide and the NF-optical device.

12 Claims, 10 Drawing Sheets

FOREIGN PATENT DOCUMENTS

| JP | A-2008-204586 | 9/2008 |
|---|---|---|
| JP | A-2008-257819 | 10/2008 |
| WO | WO 2009/147725 A1 | 12/2009 |

OTHER PUBLICATIONS

Hochberg et al.; "Integrated plasmon and dielectric waveguides;" *Optics Express*; 2004; pp. 5481-5486; vol. 12; No. 22.

Otto; "Excitation of Nonradiative Surface Plasma Waves in Silver by the Method of Frustrated Total Reflection;" *Zeitschrift für Physik*; 1968; pp. 398-410; vol. 216.

U.S. Appl. No. 12/616,924, filed Nov. 12, 2009 in the name of Komura et al.

\* cited by examiner

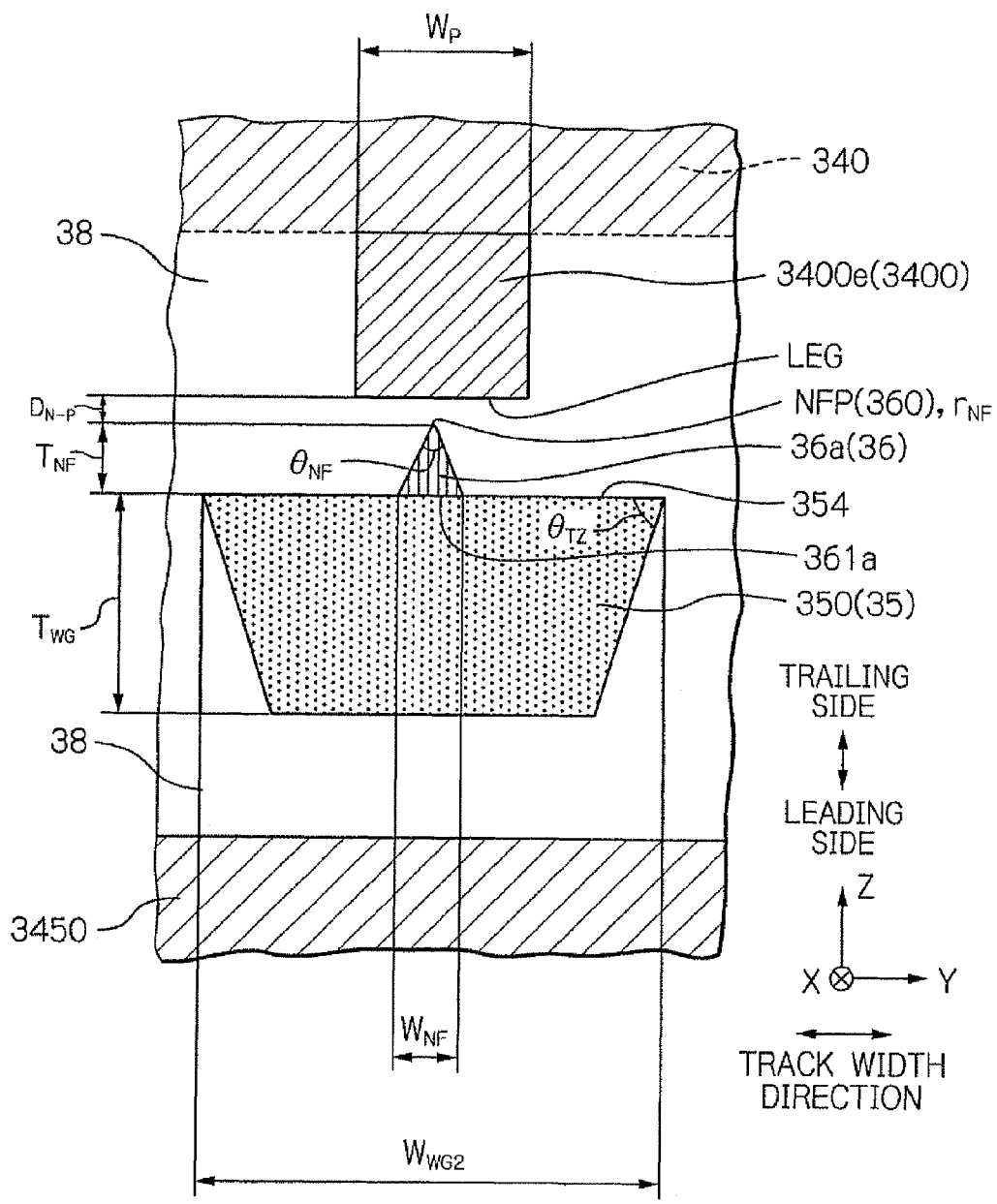

THERMALLY-ASSISTED MAGNETIC RECORDING HEAD COMPRISING WAVEGUIDE WITH INVERTED-TRAPEZOIDAL SHAPE

BACKGROUND OF THE INVENTION

1. Field of the Invention

The present invention relates to a head used for thermally-assisted magnetic recording in which a light propagating through a waveguide is converted into near-field light (NF-light), a magnetic recording medium is irradiated with the NF-light, thereby anisotropic magnetic field of the medium is lowered, thus data can be written. Further, the present invention relates to a magnetic recording apparatus provided with the head.

2. Description of the Related Art

As the recording densities of magnetic recording apparatuses become higher, as represented by magnetic disk apparatuses, further improvement has been required in the performance of thin-film magnetic heads and magnetic recording media. To improve the recording densities, it is necessary to decrease the size of magnetic grains that constitute a magnetic recording layer of the medium and to reduce irregularity in the boundary of record bit, thus to form minute record bits reliably. However, the decrease in size of the magnetic grains raises a problem of degradation in thermal stability of the magnetization due to the decrease in volume. As a measure against the thermal stability problem, it may be possible to increase magnetic anisotropy energy $K_U$ of the magnetic grains. However, the increase in energy $K_U$ causes the increase in anisotropic magnetic field (coercive force) of the magnetic recording medium. As a result, the head cannot write data to the magnetic recording medium when the anisotropic magnetic field (coercive force) of the medium exceeds the write field limit.

Recently, as a method for solving the problem of thermal stability, so-called a thermally-assisted magnetic recording technique is proposed. In the technique, a magnetic recording medium formed of a magnetic material with a large magnetic anisotropy energy $K_U$ is used so as to stabilize the magnetization; anisotropic magnetic field of the medium is reduced by applying heat to a portion of the medium where data is to be written; just after that, writing is performed by applying write magnetic field (write field) to the heated portion.

In the thermally-assisted magnetic recording, a technique is well known, which utilizes a near-field optical device (NF-optical device) as a metal piece that generates NF-light from plasmon excited by irradiated laser light, so-called plasmon antenna. For example, U.S. Pat. Nos. 6,768,556 and 6,649,894 disclose a technique in which NF-light is generated by irradiating a metal scatterer with light and by matching the frequency of the light with the resonant frequency of plasmon excited in the metal.

As described above, various kinds of thermally-assisted magnetic recording systems with NF-optical devices have been proposed. Meanwhile, the present inventors have devised a NF-optical device in which laser light is coupled with the NF-optical device in a surface plasmon mode to cause excited surface plasmon to propagate to the opposed-to-medium surface, thereby providing NF-light, instead of directly applying laser light to a NF-optical device. The NF-optical device is hereinafter referred to as a surface plasmon generator. In the surface plasmon generator, its temperature does not excessively rise because laser light is not directly applied to the surface plasmon generator. As a result, there can be avoided a situation in which the end of a read head element, which reaches the opposed-to-medium surface, becomes relatively far apart from the magnetic recording medium due to the thermal expansion of the NF-optical device, which makes it difficult to properly read servo signals. In addition, there can also be avoided a situation in which the light use efficiency is degraded because thermal fluctuation of free electrons increases in the NF light generator. Here, the light use efficiency is a ratio of the intensity of NF-light emitted from the NF-optical device relative to the intensity of laser light incident to the waveguide.

In a near-field light generating (NFL-generating) optical system that includes the surface plasmon generator devised by the present inventors and a waveguide through which laser light propagates, it is important to improve the light use efficiency descried above. Here, the surface plasmon generator includes a portion where the generator is coupled with the waveguide light in a surface plasmon mode. Specifically, a surface plasmon mode is induced in the portion by coupling between evanescent light that is equivalent to waveguide light seeping from the waveguide and fluctuations in charge excited on the surface of the surface plasmon generator, thereby exciting surface plasmon. Accordingly, in order to increase the light use efficiency of the NFL-generating optical system described above, it is important to enable the evanescent light to well reach a desired location in the surface plasmon generator. To that end, some artifices are needed not only in the structure of the surface plasmon generator but also in the configuration of the NFL-generating optical system including the waveguide.

SUMMARY OF THE INVENTION

Some terms used in the specification will be defined before explaining the present invention. In a layered structure or an element structure formed on an element-formation surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z direction corresponds to a trailing side and −Z direction to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a thermally-assisted magnetic recording head is provided, which comprises:

a magnetic pole for generating write field from its end surface on an opposed-to-medium surface side;

a waveguide through which a light for exciting surface plasmon propagates; and a near-field (NF-) optical device configured to be coupled with the light in a surface plasmon mode and to emit near-field light (NF-light) from its near-field-light-generating (NFL-generating) end surface that forms a portion of the opposed-to-medium surface and is located adjacent to the end surface of the magnetic pole on the opposed-to-medium surface side, wherein a cross-section of the waveguide has substantially a shape of a trapezoid in which a longer side of opposed sides parallel to each other is an edge of the cross-section on the NF-optical device side, in at least a portion of the waveguide that is opposed to or has a contact with the NF-optical device. Here, the cross-section of the waveguide is taken by a plane perpendicular to an edge of the waveguide along its elongated direction.

In the thermally-assisted magnetic recording head according to the present invention, it is preferable that the cross-section of the waveguide has substantially a shape of an isosceles trapezoid, and the longer side and a side adjacent to the longer side form a acute angle $\theta_{TZ}$. Here, the effective distribution range of light seeping from the waveguide (light penetrating outside the waveguide) is defined as a range including substantially all energy of light propagating through the waveguide, that is, a range that is outside the waveguide and is located on the NF-optical device side in a range within $\pm 3\sigma$ from the position of the intensity center in the waveguide (a range including approximately 99.7% of light energy) in the direction perpendicular to the side surface of the waveguide. The waveguide having the above-described cross-section of an inverted-trapezoid enables a coupled portion of the NF-optical device which is coupled with the light in a surface plasmon mode to be placed in the effective distribution range of the seeping light. Consequently, there can be realized a sufficiently strong coupling in a surface plasmon mode between the light seeping from the waveguide and the NF-optical device. Thus, the light use efficiency of the NFL-generating optical system including the waveguide and the NF-optical device can be improved. Here, it is preferable that the angle formed between the longer side and the adjacent side is equal to or more than 45 degrees (°) and is equal to or less than 89.5°.

Further, in the above-described thermally-assisted magnetic recording head according to the present invention, it is preferable that the NF-optical device comprises: a contact-to-waveguide surface having a surface contact with the waveguide; and a propagative edge for propagating surface plasmon excited by the light, located on an opposite side to the contact-to-waveguide surface in the NF-optical device and extending to the NFL-generating end surface, at least a portion of the propagative edge being located in an effective distribution range of a light seeping from the waveguide as a portion coupled with the light in a surface plasmon mode. This optical system including the waveguide and the NF-optical device forms a Kretschmann configuration as will be explained later.

The Kretschmann configuration is a configuration of optical systems for exciting surface plasmon by using evanescent light, and is a configuration in which a first dielectric region, a metal region, and a second dielectric region that has a refractive index lower than that of the first dielectric region are sequentially disposed from the side of the incidence of laser light, any neighboring regions having a contact with each other. The formation of optical system in the thermally-assisted magnetic recording head utilizing the Kretschmann configuration enables the intensity of NF-light to be drastically reduced at the position of the edge on the waveguide side on the NFL-generating end surface. That is, there can be more intensively generated NF-light at the position on the magnetic pole side on the NFL-generating end surface.

Furthermore, in the above-described thermally-assisted magnetic recording head according to the present invention, it is also preferable that the NF-optical device comprises: an opposed-to-waveguide surface opposed to the waveguide with a predetermined distance; and a propagative edge for propagating surface plasmon excited by the light, located on an opposite side to the opposed-to-waveguide surface in the NF-optical device and extending to the NFL-generating end surface, at least a portion of the propagative edge being located in an effective distribution range of a light seeping from the waveguide as a portion coupled with the light in a surface plasmon mode. This optical system including the waveguide and the NF-optical device forms an Otto configuration as will be explained later.

The Otto configuration is a configuration in which a first dielectric region, a second dielectric region that has a refractive index lower than that of the first dielectric region, and a metal region are sequentially disposed from the side of the incidence of laser light, any neighboring regions having a contact with each other. Since the formation of optical system in the thermally-assisted magnetic recording head utilizing the Otto configuration includes a buffering portion between the waveguide and the NF-optical device, surface plasmon can be excited without exerting a significant influence on the wavenumber K of light propagating through the waveguide. Consequently, the coupling of the light with surface plasmon can be easily kept at a high level.

Moreover, in the above-described thermally-assisted magnetic recording head according to the present invention, it is also preferable that the NF-optical device comprises a propagative edge for propagating surface plasmon excited by the light, opposed to the waveguide with a predetermined distance and extending to the NFL-generating end surface, at least a portion of the propagative edge being located in an effective distribution range of a light seeping from the waveguide as a portion coupled with the light in a surface plasmon mode. This optical system including the waveguide and the NF-optical device also forms an Otto configuration.

Further, in the above-described thermally-assisted magnetic recording head according to the present invention, the NF-optical device is preferably provided between the waveguide and the magnetic pole. And the NF-optical device is preferably covered with a material having a refractive index lower than a refractive index of a constituent material of the waveguide. Further, a magnetic shield is preferably provided on an opposite side to the magnetic pole when viewed from the NF-optical device.

According to the present invention, a head gimbal assembly (HGA) is further provided, which comprises: a thermally-assisted magnetic recording head as described above; and a suspension supporting the thermally-assisted magnetic recording head.

According to the present invention, a magnetic recording apparatus is further provided, which comprises: at least one HGA as described above; at least one magnetic recording medium; and a recording circuit configured to control write operations that the thermally-assisted magnetic recording head performs to the at least one magnetic recording medium, the recording circuit further comprising a light-emission control circuit configured to control operations of a light source that generates the light for exciting surface plasmon.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 5 shows a plain view illustrating the shapes of the end surfaces of the waveguide, the surface plasmon generator and the electromagnetic transducer on the head end surface.

DESCRIPTION OF THE PREFERRED EMBODIMENTS

Figure 1:
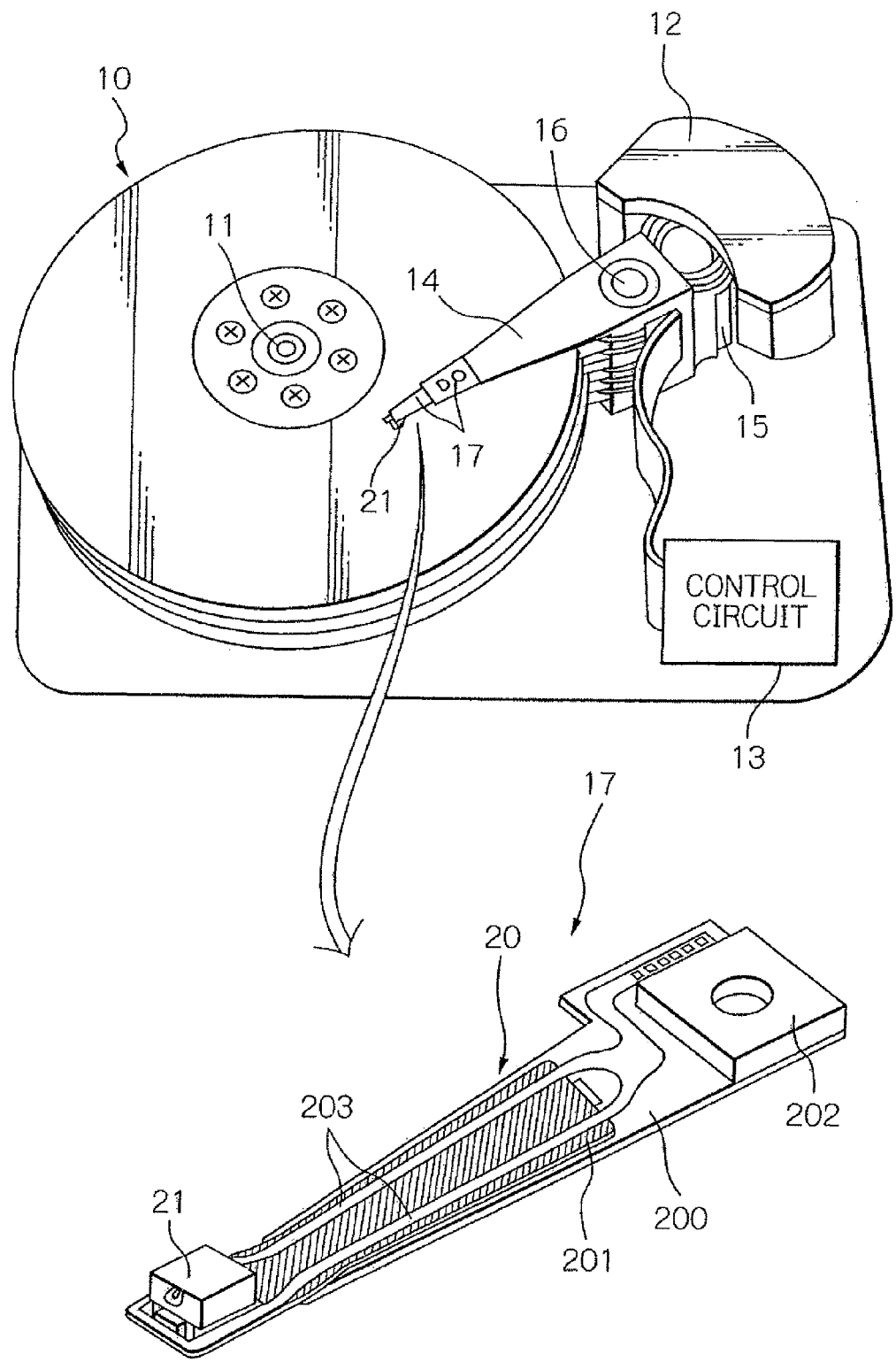
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and an HGA according to the present invention. Here, in the perspective view of the HGA, the side of the HGA, which is opposed to the surface of the magnetic recording medium, is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 therein; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode as a light source that generates laser light used for thermally-assisted magnetic recording, which will be described later. In the present embodiment, the magnetic disk 10 is designed for perpendicular magnetic recording, and has a structure in which sequentially stacked on a disk substrate is a soft-magnetic under layer, an intermediate layer, and a magnetic recording layer (perpendicular magnetization layer). The assembly carriage device 12 is a device for positioning the thermally-assisted magnetic recording head 21 above a track on which recording bits are aligned, the track being formed on the magnetic recording layer of the magnetic disk 10. In the apparatus, the drive arms 14 are stacked in a direction along a pivot bearing axis 16 and can be angularly swung around the axis 16 by a voice coil motor 15. The structure of the magnetic disk apparatus according to the present invention is not limited to that described above. For instance, the number of each of magnetic disks 10, drive arms 14, HGAs 17 and thermally-assisted magnetic recording heads 21 may be single.

Referring also to FIG. 1, a suspension 20 in the HGA 17 includes a load beam 200, a flexure 201 with elasticity fixed to the load beam 200, and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201 at the top end portion of the suspension 20 so as to face the surface of the magnetic disk 10 with a predetermined spacing (flying height). Moreover, one end of the wiring member 203 is electrically connected to terminal electrodes of the thermally-assisted magnetic recording head 21. The structure of the suspension 20 is not limited to the above-described one. An IC chip for driving the head may be mounted midway on the suspension 20, though not shown.

Figure 2:
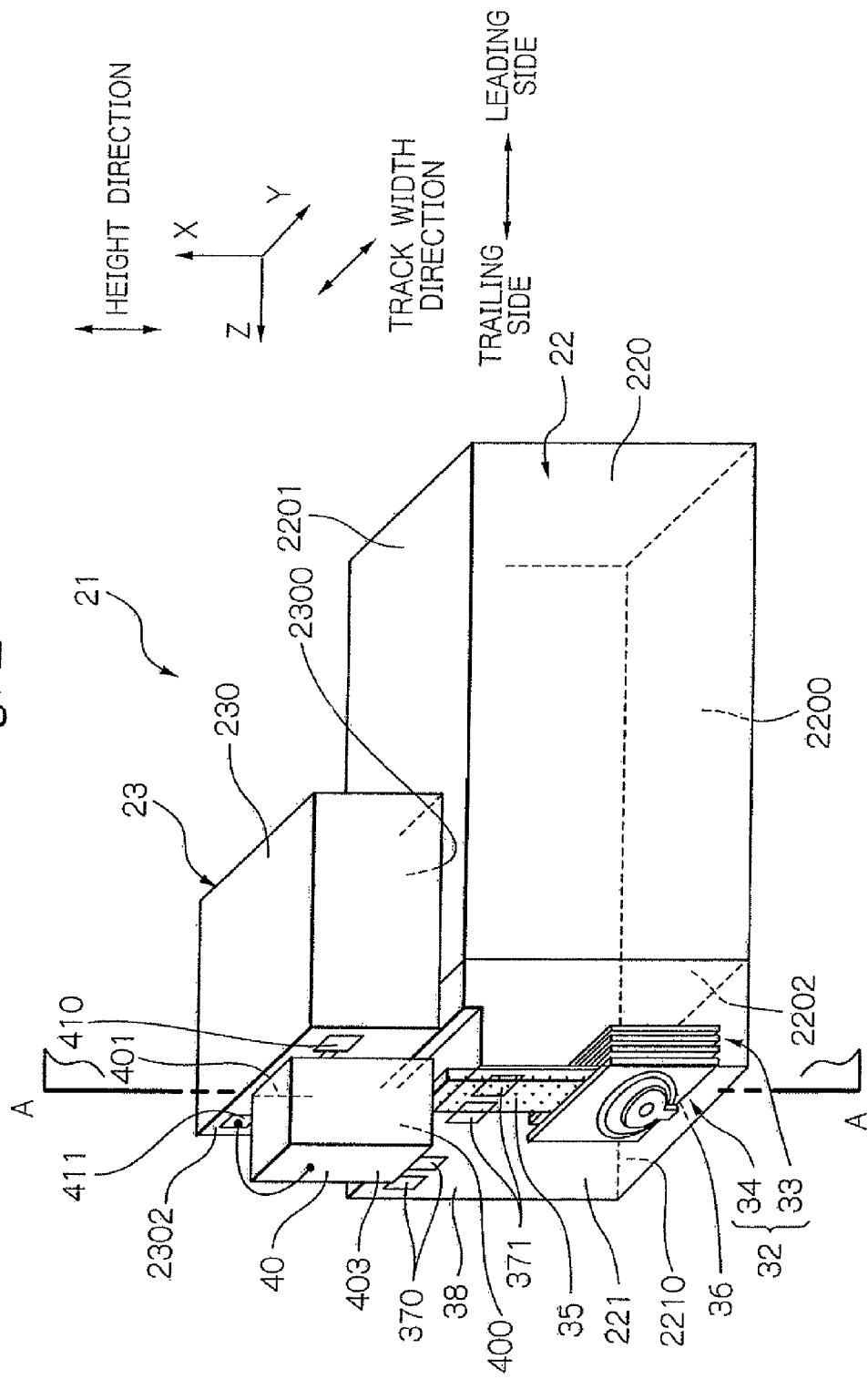
FIG. 2 shows a perspective view illustrating one embodiment of thermally-assisted magnetic recording head according to the present invention.

FIG. 2 shows a perspective view illustrating one embodiment of thermally-assisted magnetic recording head 21 according to the present invention.

As shown in FIG. 2, a thermally-assisted magnetic recording head 21 is constituted of a slider 22 and a light source unit 23. The slider 22 includes: a slider substrate 220 formed of, for example, AlTiC ($Al_2O_3$—TiC), and having an air bearing surface (ABS) 2200 processed so as to provide an appropriate flying height; and a head element part 221 formed on an element-formation surface 2202 perpendicular to the ABS 2200. While, the light source unit 23 includes: a unit substrate 230 formed of, for example, AlTiC ($Al_2O_3$—TiC), and having an joining surface 2300; and a laser diode 40 as a light source provided on a source-installation surface 2302 perpendicular to the joining surface 2300. The slider 22 and the light source unit 23 are bonded to each other in such a way that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220. Alternatively, the thermally-assisted magnetic recording head 21 may have a configuration in which the laser diode 40 is provided directly on the slider 22 without using the light source unit 23.

In the slider 22, the head element part 221 formed on the element-formation surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 for guiding laser light generated from a laser diode 40 provided in the light source unit 23 to the opposed-to-medium surface side; a surface plasmon generator 36, the generator 36 and the waveguide 35 constituting a near-field light generating (NFL-generating) optical system; an overcoat layer 38 formed on the element-formation surface 2202 in such a way as to cover the MR element 33, the electromagnetic transducer 34, the waveguide 35, and the surface plasmon generator 36; a pair of terminal electrodes 370 exposed in the upper surface of the overcoat layer 38 and electrically connected to the MR element 33; and a pair of terminal electrodes 371 also exposed in the upper surface of the overcoat layer 38 and electrically connected to the electromagnetic transducer 34. The terminal electrodes 370 and 371 are electrically connected to the connection pads of the wiring member 203 provided on the flexure 201 (FIG. 1).

One ends of the MR element 33, the electromagnetic transducer 34 and the surface plasmon generator 36 reach a head end surface 2210, which is an opposed-to-medium surface of the head element part 221. Here, the head end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light generated from the laser diode 40 of the light source unit 23 propagates through the waveguide 35. Then, the propagating laser light is coupled with the surface plasmon generator 36 in a surface plasmon mode, and causes surface plasmon to be excited on the surface plasmon generator 36. The surface plasmon propagates on a propagative edge, which will be explained later, of the surface plasmon generator 36 toward the head end surface 2210, the propagative edge being on the side opposite to the waveguide 35 in the surface plasmon generator 36. Thereby, near-field light (NF-light) is generated from the end of the surface plasmon generator 36 on the head end surface 2210 side. The generated NF-light reaches the surface of the magnetic disk, and heats a portion of the magnetic recording layer of the magnetic disk. As a result, the anisotropic magnetic field (coercive force) of the portion is decreased to a value that enables writing; thus the thermally-assisted magnetic recording can be accomplished by applying write field to the portion with decreased anisotropic magnetic field.

Figure 3:
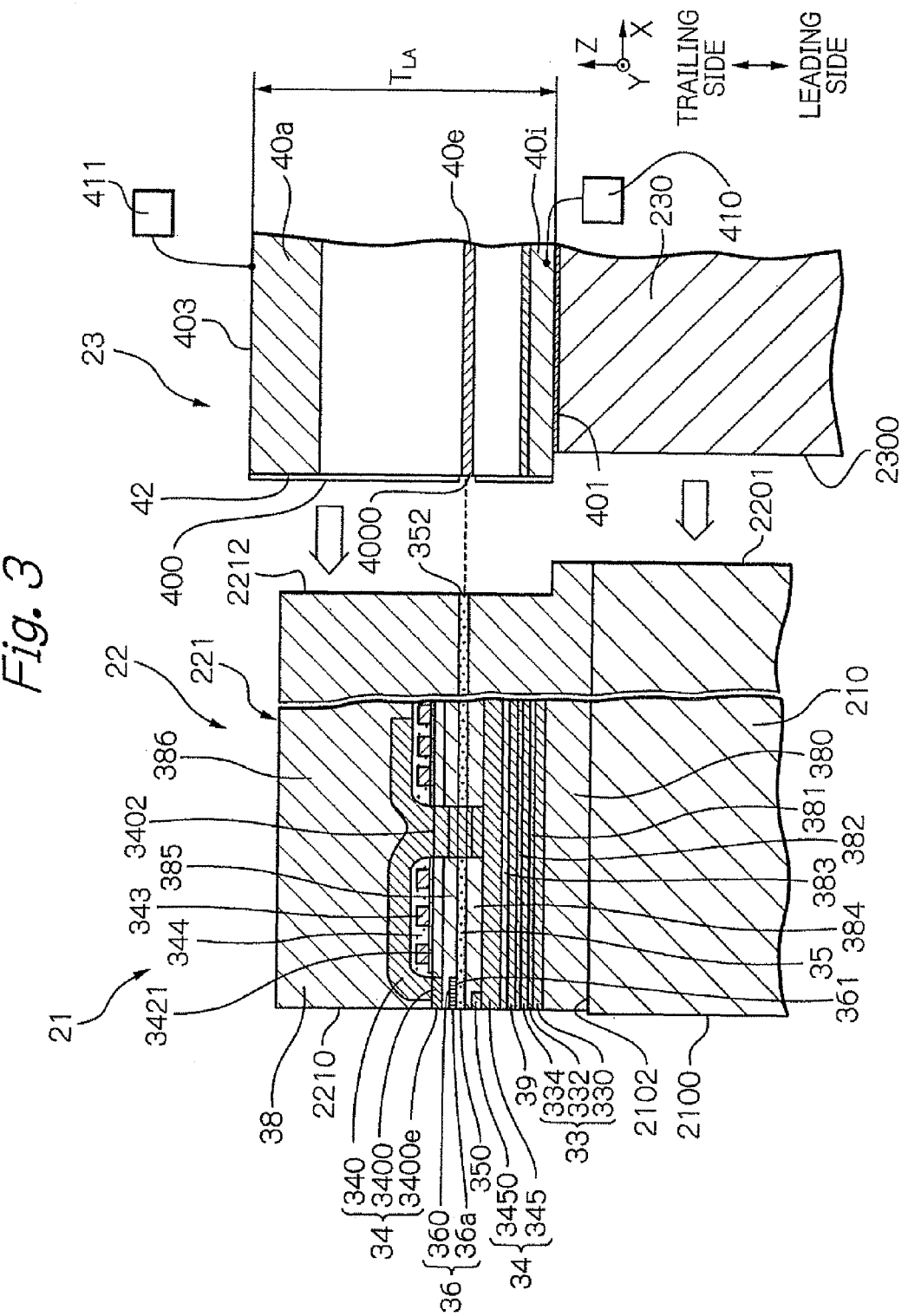
FIG. 3 shows a cross-sectional view taken by plane A in FIG. 2, schematically illustrating the structure of a main part of the thermally-assisted magnetic recording head according to the present invention.

FIG. 3 shows a cross-sectional view taken by plane A in FIG. 2, schematically illustrating the structure of a main part of the thermally-assisted magnetic recording head 21.

As shown in FIG. 3, the MR element 33 is formed on an insulating layer 380 stacked on the element-formation surface 2202, and includes: an MR multilayer 332; and a lower shield layer 330 and an upper shield layer 334 which sandwich the MR multilayer 332 and an insulating layer 381 therebetween. The upper and lower shield layers 334 and 330 prevent the MR multilayer 332 from receiving external magnetic field as a noise. The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes.

Referring also to FIG. 3, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

Figure 4:
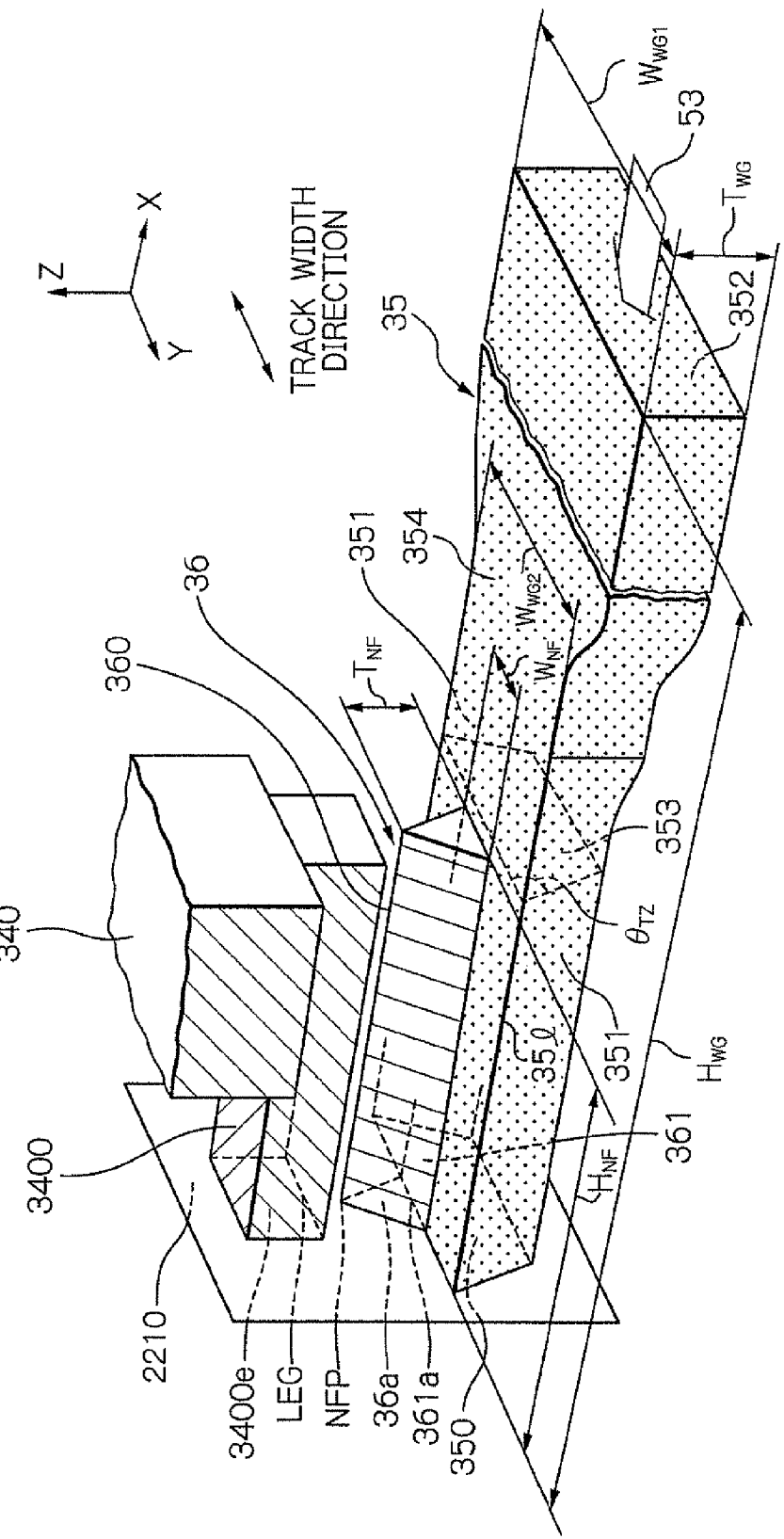
FIG. 4 shows a perspective view schematically illustrating the configuration of the waveguide, the surface plasmon generator and the main magnetic pole.

The main magnetic pole 3400 is formed on an insulating layer 385 made of an insulating material such as $Al_2O_3$ (alumina), and the upper yoke layer 340 is formed so as to cover the coil-insulating layer 344. These upper yoke layer 340 and main magnetic pole 3400 are magnetically connected with each other, and acts as a magnetic path for converging and guiding magnetic flux toward the magnetic recording layer (perpendicular magnetization layer) of the magnetic disk, the magnetic flux being excited by write current flowing through the write coil layer 343. The main magnetic pole 3400 reaches the head end surface 2210, and the end surface 3400e of the pole 3400, which is a portion of the end surface 2210, has an edge (LEG: FIGS. 4 and 5) closest to the lower shield 3450 (most on the leading side), the edge being at a position where write field is generated. The edge LEG has a much small width $W_P$ (FIG. 5) in the track width direction (Y-axis direction), which enables a fine write field responding to higher recording density to be generated. The width $W_P$ is, for example, in the range from 0.05 μm (micrometer) to 0.5 μm. The main magnetic pole 3400 is formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the main magnetic pole 3400 is, for example, in the range from 0.1 to 0.8 μm.

The write coil layer 343 is formed on an insulating layer 3421 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment. However, the write coil layer 343 may have a two or more layered structure, or may have a helical coil shape in which the upper yoke layer 340 is sandwiched therebetween. Further, the number of turns of the write coil layer 343 is not limited to that shown in FIG. 3, and may be, for example, in the range from two to seven.

The back contact portion 3402 has a though-hole extending in X-axis direction, and the waveguide 35 and insulating layers that cover the waveguide 35 pass through the though-hole. In the though-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 345 is formed of a soft-magnetic material, and its thickness is, for example, approximately 0.5 to 5 μm. Further, the lower shield 3450 is a magnetic shield that reaches the head end surface 2210, being magnetically connected with the lower yoke layer 345. The lower shield 3450 is provided on the opposite side to the main magnetic pole 3400 from the surface plasmon generator 36, and acts for receiving the magnetic flux spreading from the main magnetic pole 3400. The lower shield 3450 has a width in the track width direction greatly larger than that of the main magnetic pole 3400. This lower shield 3450 causes the magnetic field gradient between the end portion of the lower shield 3450 and the main magnetic pole 3400 to become steeper. As a result, jitter of signal output becomes smaller, and therefore, error rates during read operations can be reduced. The lower shield 3450 is preferably formed of a material with high saturation magnetic flux density such as NiFe (Permalloy) or an iron alloy as the main magnetic pole 3400 is formed of.

As shown also in FIG. 3, the waveguide 35 and the surface plasmon generator 36 are provided between the lower yoke layer 345 (lower shield 3450) and an upper yoke layer 340 (main magnetic pole 3400), and form an optical system for generating NF-light in the head element part 221. The waveguide 35 is provided in parallel with an element-formation surface 2202 and extends from the rear end surface 352 which is a portion of the head rear end surface 2212 to the end surface 350 which is a portion of the head end surface 2210. Alternatively, the end surface 350 may be recessed in +X direction from the head end surface 2210, not reaching the end surface 2210. The surface plasmon generator 36 is located between the waveguide 35 and the main magnetic pole 3400, and includes: a contact-to-waveguide surface 361 that is contacted to the waveguide 35 in the present embodiment; and a propagative edge 360 that is located on the side opposite to the contact-to-waveguide surface 361 (on the trailing side; +Z side) of the surface plasmon generator 36. The propagative edge 360 extends to a NFL-generating end surface 36a that generates NF-light, and propagates surface plasmon to the NFL-generating end surface 36a, the surface plasmon being excited by laser light (waveguide light) that has propagated through the waveguide 35.

A detailed explanation of the waveguide 35, the surface plasmon generator 36 and the main magnetic pole 3400 will be given later with reference to FIG. 4. Further, as is in the present embodiment, an inter-element shield layer 39 may be provided between the MR element 33 and the electromagnetic transducer 34, sandwiched by the insulating layers 382 and 383. The inter-element shield layer 39 is preferably formed of a soft-magnetic material, and plays a role for shielding the MR element 33 from magnetic field generated from the electromagnetic transducer 34.

Also according to FIG. 3, the light source unit 23 includes: a unit substrate 230; a laser diode 40 provided on the source-installation surface 2302 of the unit substrate 230; a terminal electrode 410 electrically connected to an electrode that forms the lower surface 401 of the laser diode 40; and a terminal electrode 411 electrically connected to an electrode that forms the upper surface 403 of the laser diode 40. The terminal electrodes 410 and 411 are electrically connected to the connection pads of the wiring member 203 provided on the flexure 201 (FIG. 1). By applying a predetermined voltage between both electrodes 410 and 411 of the laser diode 40, laser light is emitted from the emission center on an emission surface 400 of the laser diode 40. Here, in the configuration of the head as shown in FIG. 3, the oscillation of electric field component of the laser light generated from the laser diode 40 preferably has a direction perpendicular to the stacking surface of the active layer 40e (Z-axis direction). That is, the laser diode 40 preferably generates a laser light with TM polarization. This enables the laser light propagating through the waveguide 35 to be coupled with the surface plasmon generator 36 in a surface plasmon mode.

A light source such as InP base, GaAs base or GaN base diode can be utilized as the laser diode 40, which is usually used for communication, optical disk storage or material analysis. The wavelength $\lambda_L$ of the radiated laser light may be, for example, in the range of approximately 375 nm (nanometers) to 1.7 μm. The laser diode 40 is of edge-emitting type in the present embodiment, and has a multilayered structure including an upper-electrode 40a, an active layer 40e, and a lower-electrode 40i. On the front and rear cleaved surfaces of the multilayered structure of the laser diode 40, respectively formed are reflective layers for exciting the oscillation by total reflection. The reflective layer 42 has an opening in the position of the active layer 40e including the light-emission center 4000. Here, the laser diode 40 has a thickness $T_{LA}$ in the range of, for example, approximately 60 to 200 μm.

Further, an electric source provided within the magnetic disk apparatus can be used for driving the laser diode 40. In fact, the magnetic disk apparatus usually has an electric source with applying voltage in the range, for example, approximately from 2V to 5V, which is sufficient for the laser oscillation. The laser diode 40 and terminal electrodes 410 and 411 are not limited to the above-described embodiment. For example, the electrodes of the laser diode 40 can be turned upside down, thus the n-electrode 40a may be bonded to the source-installation surface 2302 of the unit substrate 230. Further, alternatively, a laser diode may be provided on the element-formation surface 2202 of the thermally-assisted magnetic recording head 21, and then can be optically connected with the waveguide 35. Furthermore, the thermally-assisted magnetic recording head 21 may include no laser diode 40; then, the light-emission center of a laser diode provided within the magnetic disk apparatus and the rear-end surface 352 of the waveguide 35 may be connected by using, for example, optical fiber.

Each of the slider 22 and light source unit 23 may have an arbitrary size. For example, the slider 22 may be so-called a femto slider in which the width in the track width direction (Y-axis direction) is 700 μm; the length (in Z-axis direction) is 850 μm; and the thickness (in X-axis direction) is 230 μm. In the case, the light source unit 23 may be one size smaller than the slider 22, and may have a size, for example, in which the width in the track width direction is 425 μm; the length is 300 μm; and the thickness is 300 μm.

By joining the above-described light source unit 23 and slider 22, there is constituted the thermally-assisted magnetic recording head 21. In the joining, the joining surface 2300 of the unit substrate 230 is made having a surface contact with the back surface 2201 of the slider substrate 220. Then, the locations of the unit substrate 230 and the slider substrate 220 are determined in such a way that the laser light generated from the laser diode 40 can directly enter the waveguide 35 through the rear-end surface 352 of the waveguide 35.

FIG. 4 shows a perspective view schematically illustrating the configuration of the waveguide 35, the surface plasmon generator 36 and the main magnetic pole 3400. In the figure, the head end surface 2210 is positioned at the left side, the end surface 2210 including positions where write field and NF-light are emitted toward the magnetic recording medium.

Referring to FIG. 4, there are provided a waveguide 35 that propagates laser light 53 for generating NF-light and a surface plasmon generator 36 that propagates surface plasmon excited by the laser light (waveguide light) 53 propagating through the waveguide 35 and generates NF-light. The surface plasmon generator 36 includes: a contact-to-waveguide surface 361 that is contacted to the waveguide 35 in the present embodiment; a propagative edge 360 that is located on the side opposite to the contact-to-waveguide surface 361 (on the trailing side; +Z side) of the surface plasmon generator 36; and a NFL-generating end surface 36a that reaches the head end surface 2210, from which NF-light is generated. That is, the waveguide 35 and the surface plasmon generator 36 have a surface contact with each other. The propagative edge 360 extends to the NFL-generating end surface 36a, and acts for propagating surface plasmon to the NFL-generating end surface 36a, the surface plasmon being excited by the waveguide light 53. In the present embodiment, the surface plasmon generator 36 has substantially a shape of triangle pole extending in X-axis direction. The contact-to-waveguide surface 361 is one of side surfaces (plain surfaces) of the triangle pole, and the propagative edge 360 is a side edge that is opposed to the one side surface. Here, the above term "substantially" means that the triangle pole as a shape of the surface plasmon generator 36 includes a generator shape in which, for example, at least one side surface becomes somewhat curved or at least one side edge is rounded with a predetermined curvature, depending on the method for forming the surface plasmon generator 36.

Further, the surface plasmon generator 36, except the contact-to-waveguide surface 361, is covered with the insulating layer 385 (FIG. 3) that has a refractive index lower than that of the constituent material of the waveguide 35. That is, the insulating layer 385 covers the propagative edge 360 that is located on the side opposite to the waveguide 35; the insulating layer 385 lies also between the waveguide 35 and the main magnetic pole 3400. The waveguide light that has propagated through the waveguide 35 can be coupled with the surface plasmon generator 36, especially with the propagative edge 360, in a surface plasmon mode by using the insulating layer 385 as a buffering portion. The insulating layer 385, as well as the insulating layer 384, covers a portion of the waveguide 35 at least near the head end surface 2210, and acts as a clad, the waveguide 35 acting as a core. Further, in the present embodiment, the insulating layer 385, which is a portion of the overcoat layer 38, is used as a buffering portion; another layer may be provided as the buffering portion instead of the insulating layer 385.

Here, a portion of the upper surface (side surface) of the waveguide 35 and the contact-to-waveguide surface 361 of the surface plasmon generator 36 have a surface contact with each other, and the waveguide 35, the surface plasmon generator 36, and a portion of the insulating layer 385 are arranged in a Kretschmann configuration. The Kretschmann configuration is a configuration of optical systems for exciting surface plasmon by using evanescent light, and is a configuration in which a first dielectric region, a metal region, and a second dielectric region that has a refractive index lower than that of the first dielectric region are sequentially disposed from the side of the incidence of laser light, any neighboring regions having a contact with each other. The Kretschmann configuration is explained in detail, for example, in E. Kretschmann and H. Raether, "Radiative Decay of Non Radiative Surface Plasmons Excited by Light", Z. Naturforsch. Vol. 23a, pp2135-2136 (1968).

The formation utilizing the Kretschmann configuration as shown in FIG. 4 enables the intensity of NF-light to be drastically reduced at the position of the edge 361a on the waveguide 35 side on the NFL-generating end surface 36a. That is, there can be more intensively generated NF-light at the vertex NFP on the main magnetic pole 3400 side, which is the intended position.

Referring again to FIG. 4, the waveguide 35 is provided on the −z side (leading side) of the surface plasmon generator 36, that is, on the side opposite to the main magnetic pole 3400 when viewed from the waveguide 35. In this configuration, the waveguide 35 can be located at a distance from the main magnetic pole 3400 even though the end surface 3400e of the main magnetic pole 3400 that generates write field is adjacent to the NFL-generating end surface 36a that generates NF-light. This can prevent reduction in the amount of the waveguide light 53 to be converted into NF-light due to partial absorption of the waveguide light 53 into the main magnetic pole 3400 made of a metal.

The waveguide 35 may have a shape with a constant width in the track width direction (Y-axis direction), or as shown in FIG. 4, may have a portion on the head end surface 2210 side, which has a narrower width in the track width direction (Y-axis direction). The width $W_{WF1}$ in the track width direction (Y-axis direction) of a portion of the waveguide 35 on the rear end surface 352 side may be, for example, in the range approximately from 0.5 to 200 µm, the rear end surface 352 being opposite to the head end surface 2210 in the waveguide 35. The width $W_{WG2}$ in the track width direction (Y-axis direction) of a portion of the waveguide 35 on the end surface 350 side may be, for example, in the range approximately from 0.3 to 100 µm. And the thickness $T_{WG}$ (in Z-axis direction) of a portion on the rear end surface 352 side may be, for example, in the range approximately from 0.1 to 4 µm, and the height (length) $H_{WG}$ (in X-axis direction) may be, for example, in the range approximately from 10 to 300 µm.

Further, the cross-section of the waveguide 35, taken by a plane (YZ-plane) perpendicular to the edge (of the upper surface 354 in FIG. 4) of the waveguide 35 along its elongated direction (along X-axis direction), has substantially a shape of a trapezoid, preferably an isosceles trapezoid, in which the longer one of opposed sides parallel to each other is an edge of the cross-section on the surface plasmon generator 36 side, in at least a portion of the waveguide that faces or has a contact with the surface plasmon generator 36. Here, the term "substantially" is used to represent inclusion of a trapezoidal shape of the cross-section with the edge somewhat curved and a trapezoidal shape of the cross-section with somewhat rounded corners depending on the method for fabricating the waveguide 35.

Since the cross-section of the waveguide 35 has the shape of an inverted-trapezoid whose longer side is on the surface plasmon generator 36 side as described above, a portion of the surface plasmon generator 36 which is coupled with waveguide light 53 in a surface plasmon mode can be placed in the effective distribution range of light seeping from the waveguide 35 as will be detailed later. The longer side of the (isosceles) trapezoidal cross-section of the waveguide 35 on the surface plasmon generator 36 side and the side adjacent to the longer side form an acute angle $\theta_{TZ}$, which is preferably equal to 45 degrees (°) or more, and equal to 89.5° or less, as will be described later. Choosing such an angle $\theta_{TZ}$ can ensure that the coupled portion of the surface plasmon generator 36 is reliably placed in the effective distribution range of light seeping from the waveguide 35.

Further, the side surfaces of the waveguide 35: the upper surface 354; the lower surface 353; and both the side surfaces 351 in the track width direction (Y-axis direction) have a surface contact with the overcoat layer 38 (FIG. 2), that is, the insulating layers 384 and 385 (FIG. 3), except a portion contacted with the contact-to-waveguide surface 361 of the surface plasmon generator 36. Here, the waveguide 35 is formed of a dielectric material with a refractive index $n_{WG}$ higher than a refractive index $n_{OC}$ of the constituent material of the overcoat layer 38, made by using, for example, a sputtering method. Therefore, the surface plasmon generator 36, except the contact-to-waveguide surface 361, is covered with the insulating layer 385 (FIG. 3) that has a refractive index $n_{OC}$ lower than a refractive index $n_{WG}$ of the constituent material of the waveguide 35. For example, in the case that the wavelength $\lambda_L$ of laser light is 600 nm and the overcoat layer 38 is formed of $Al_2O_3$ (n=1.63), the waveguide 35 can be formed of, for example, $SiO_XN_Y$ (n=1.7-1.85), $Ta_2O_5$ (n=2.16), $Nb_2O_5$ (n=2.33) or $TiO_X$ (n=2.3-2.55). This material structure of the waveguide 35 enables the propagation loss of laser light 53 to be reduced due to the excellent optical characteristics of the constituent material. Further, the existence of the waveguide 35 as a core and the overcoat layer 38 as a clad can provide total reflection conditions in all the side surfaces. As a result, more amount of laser light 53 can reach the position that is opposed to the contact-to-waveguide surface 361 of the surface plasmon generator 36, which improves the propagation efficiency of the waveguide 35. Meanwhile, the waveguide 35 is preferably a single-mode waveguide in order to stabilize the wavenumber K of the waveguide light propagating through the waveguide 35 and to reliably excite surface plasmon. Here, the single-mode waveguide is a waveguide in which the laser light propagating within the waveguide has a beam cross-section with a shape of circle or ellipsoid, and the light intensity distribution in the cross-section is single-peaked, especially a Gaussian. Laser light propagating through the single-mode waveguide can become a stable laser light with an intended intensity even in the case that, for example, the light beam is squeezed.

The surface plasmon generator 36 is preferably made of silver (Ag) or an Ag alloy mainly containing Ag. The alloy preferably contains at least one element selected from the group consisting of palladium (Pd), gold (Au), copper (Cu), ruthenium (Ru), rhodium (Rh), and iridium (Ir). By forming the surface plasmon generator 36 from such an Ag alloy, the NF-light emission efficiency second to Ag, Ag being a material having theoretically the highest NF-light emission efficiency, can be achieved and, in addition, defects such as cracking and chipping of the propagative edge 360 can be sufficiently minimized.

As shown also in FIG. 4, the surface plasmon generator 36 preferably has a thickness $T_{NF}$ (in Z-axis direction) sufficiently smaller than the wavelength of laser light 53, the thickness $T_{NF}$ being the distance between the propagative edge 360 and the contact-to-waveguide surface 361. The surface plasmon generator 36 also preferably has a width $W_{NF}$ in the track width direction (Y-axis direction) in the contact-to-waveguide surface 361, the width $W_{NF}$ being sufficiently smaller than the wavelength of laser light 53. Further, the length $H_{NF}$ (in X-axis direction) of the surface plasmon generator 36 can be set to be, for example, in the range of approximately 0.3 to 6.0 μm. The length $H_{NF}$ is, in the present embodiment, a length of the coupled portion of the surface plasmon generator 36 in a surface plasmon mode, and is preferably larger than the wavelength $\lambda_L$ of laser light 53. In this preferable case, the coupled portion has an area markedly larger than a so-called "focal region" in the case that, for example, laser light is converged on a buffering portion and a NF-optical device and is coupled in a surface plasmon mode. As a result, very stable coupling in the surface plasmon mode can be achieved.

FIG. 5 shows a plain view illustrating the shapes of the end surfaces of the waveguide 35, the surface plasmon generator 36 and the electromagnetic transducer 34 on the head end surface 2210.

As shown in FIG. 5, in the electromagnetic transducer 34, the main magnetic pole 3400 and the lower shield 3450 reach the head end surface 2210. The end surface 3400e of the main magnetic pole 3400 on the head end surface 2210 has a shape of, for example, a rectangle, a square or a trapezoid. The above-described width $W_P$ is equivalent to a length in the track width direction (Y-axis direction) of the edge LEG in the end surface 3400e, the edge LEG being closest to the lower shield 3450 (most on the leading side). Thus, the width $W_P$ determines the width of write field distribution in the track width direction. The width $W_P$ can be in the range, for example, approximately from 0.05 to 0.5 μm.

On the head end surface 2210, the NFL-generating end surface 36a of the surface plasmon antenna 36 is positioned close to the end surface 3400e of the main magnetic pole 3400 and in the leading side (−Z direction side) of the end surface 3400e. Further, in the present embodiment, the NFL-generating end surface 36a has a shape of isosceles triangle in which a bottom edge 361a is on the waveguide 35 side (leading side: +Z side) and a vertex NFP on the main magnetic pole 3400 side is an end of the propagative edge 360. The distance between the vertex NFP and the bottom edge 361a, that is, the thickness $T_{NF}$ (in Z-axis direction) of the surface plasmon generator 36 can be set in the range, for example, from 70 to 140 nm.

The vertex NFP as a point where NF-light is generated is located on the main magnetic pole 3400 side because the propagative edge 360 is provided on the side opposite to the waveguide 35, as described above. As a result, the point where NF-light is generated can be disposed much close to the edge LEG where write field is generated. The distance $D_{N-P}$ between the vertex NFP and the edge LEG on the head end surface 2210 is preferably set to a sufficiently small value of 100 nm or less. In the thermally-assisted magnetic recording according to the present invention, the vertex NFP functions as a main heating action part, and the edge LEG functions as a writing action part. Therefore, by setting the distance $D_{N-P}$ in the above-described way, write field with sufficiently large gradient can be applied to a portion of the magnetic recording layer of the magnetic disk, the portion having been sufficiently heated. This enables a stable thermally-assisted write operation to be securely achieved. Further, the vertex angle $\theta_{NF}$ of the vertex NFP of the NFL-generating end surface 36a can be set to be in the range, for example, from 10 to 50 degrees (°). Furthermore, the propagative edge 360 is rounded to prevent the reduction in light use efficiency due to the running off of the surface plasmon from the propagative edge 360. The vertex radius (curvature radius) r can be set to be in the range, for example, from 7.5 to 18 nm.

Referring also to FIG. 5, the width $\theta_{WG2}$ of the waveguide 35 in the track width direction (Y-axis direction) is in the range of approximately 0.3 to 100 μm, for example, as described above, and is chosen to be significantly larger than the width W of the contact-to-waveguide surface 361 of the surface plasmon generator 36 in the track width direction. This can make the effective distribution range of light seeping from the waveguide 35 sufficiently large in the track width direction (Y-axis direction) to ensure that the propagative edge 360, which is the coupled portion of the surface plasmon generator 36 in a surface plasmon mode, is placed in the effective distribution range of light seeping from the waveguide 35.

Figure 6A:
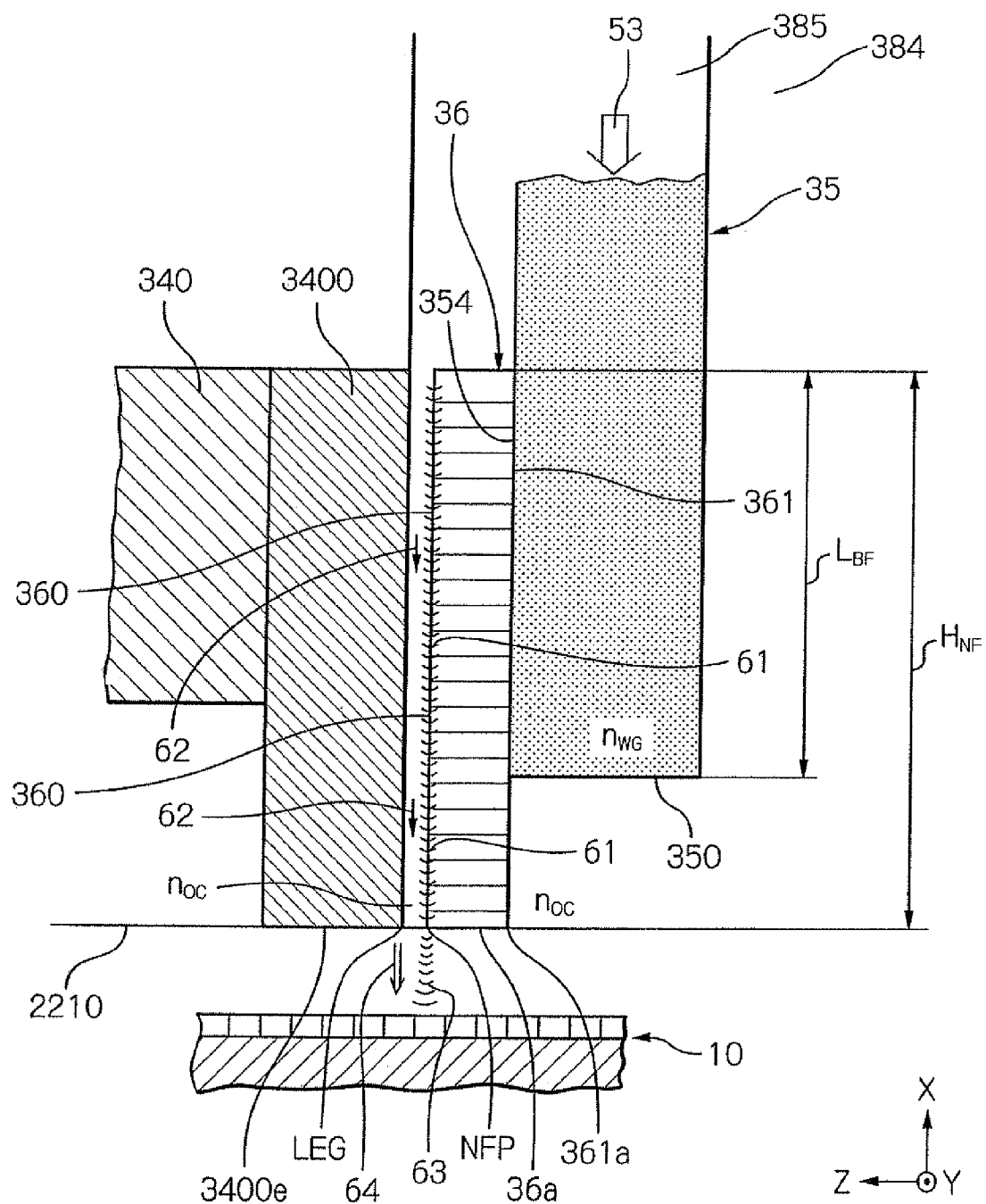
FIGS. 6a and 6b show schematic views for explaining the thermally-assisted magnetic recording utilizing a surface plasmon mode according to the present invention.
Figure 6B:
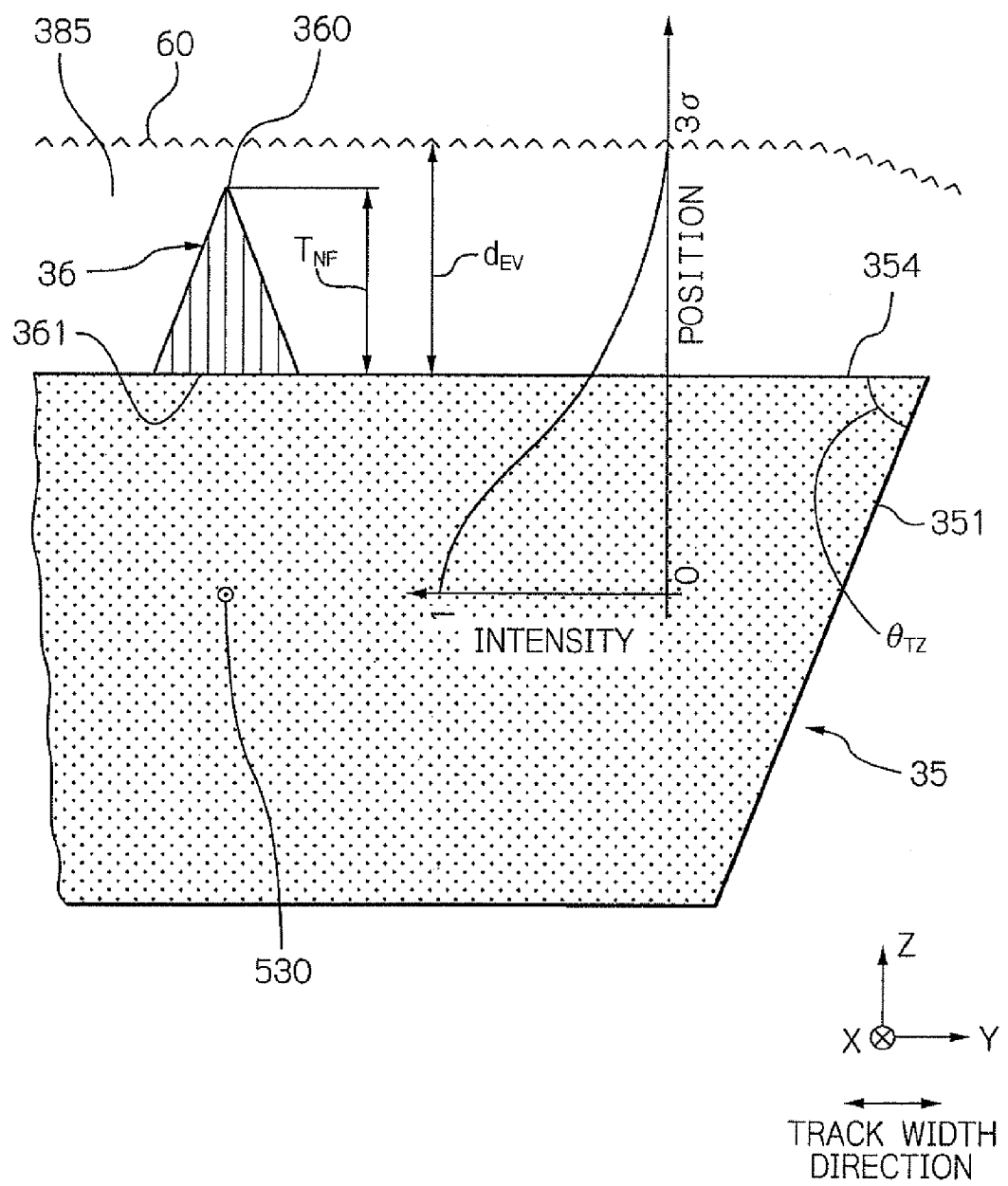

FIGS. 6a and 6b show schematic views for explaining the thermally-assisted magnetic recording utilizing a surface plasmon mode according to the present invention. FIG. 6a is a cross-sectional view taken by ZX-plane, and FIG. 6b is a cross-sectional view taken by YZ-plane. Further, in FIG. 6a, the end surface 350 of the waveguide 35 is recessed in +X direction from the head end surface 2210, not reaching the end surface 2210, as an alternative to the embodiment shown in FIG. 4. However, the principle of thermally-assisted magnetic recording explained below apples to the respective embodiments shown in FIG. 4 and FIG. 6a.

Referring to FIG. 6a, when the electromagnetic transducer 34 writes data onto the magnetic recording layer of the magnetic disk 10, first, laser light 53 emitted from the laser diode 40 of the light source unit 23 propagates through the waveguide 35. Next, the laser light (waveguide light) 53, which has advanced to near the contact-to-waveguide surface 361 of the surface plasmon generator 36, is coupled with the optical configuration including the waveguide 35 with a refractive index $n_{WG}$, the buffering portion (insulating layer 385) with a refractive index $n_{OC}$, and the surface plasmon generator 36 made of a conductive material such as a metal, and induces a surface plasmon mode in the propagative edge 360 of the surface plasmon generator 36. That is, the waveguide light couples with the surface plasmon generator 36 in a surface plasmon mode. This surface plasmon mode can be induced by setting the refractive index $n_{OC}$ of the buffering portion (insulating layer 385) to be smaller than the refractive index $n_{WG}$ of the waveguide 35 ($n_{OC} < n_{WG}$), the buffering portion covering a portion of the generator 36 including the propagative edge 360 except the contact-to-waveguide surface 361.

The structure of sequentially stacking the waveguide 35 made of a dielectric material having a refractive index $n_{WG}$, the surface plasmon generator 36 made of a conductive material such as a metal, and a portion of the insulating layer 385 made of a dielectric material having a refractive index $n_{OC}$ ($n_{OC} < n_{WG}$) constitutes Kretschmann configuration; based on this configuration, surface plasmon is excited. Actually, as shown in FIG. 6b, evanescent light 60 is excited within the insulating layer 385 (and within the surface plasmon generator 36), the evanescent light 60 being a part of waveguide light 53 seeping out from the boundary (side surface 354) of the waveguide 35. The evanescent light 60 propagates in such a way as to leave the side surface 354. The evanescent light 60 is coupled with the fluctuation of electric charge excited on the boundary of the generator 36 with respect to the insulating layer 385, which induces a surface plasmon mode centering around the propagative edge 360, and thus surface plasmon is excited. From that, in the surface plasmon generator 36, a portion of the propagative edge 360 with a length $L_{BF}$ (FIG. 6a) can be considered as the portion coupled in a surface plasmon mode with the waveguide light 53. To be exact, there excited is surface plasmon polariton in this system because surface plasmon as elementary excitation is coupled with an electromagnetic wave. However, the surface plasmon polariton will be hereinafter referred to as surface plasmon for short.

In the cross-sectional view in FIG. 6b, a YZ cross-section of the waveguide 35 has the shape of an isosceles trapezoid whose longer side is on the surface plasmon generator 36 side. Here, the longer side (side surface 354), which is on the surface plasmon generator 36 side, and the adjacent side (side surface 351) form an acute angle $\theta_{TZ}$, which is preferably equal to or more than 45°, and equal to or less than 89.5°, as will be described later. Setting the cross-section of the waveguide 35 as described above enables the effective distribution range of light 60 seeping from the waveguide 35 to be extended in +Z direction from the interface (side surface 354), as will be described later. The effective distribution range of light 60 seeping from the waveguide 35 is defined as a range including substantially all energy of light propagating through the waveguide 35, that is, a range that is outside the waveguide 35 and is located on the surface plasmon generator 36 side in a range within ±3σ from the position of the intensity center 530 in the waveguide 35 (a range including approximately 99.7% of light energy) in the direction perpendicular to the side surface 354 (the Z-axis direction). Here, σ is the standard deviation of energy distribution of light propagating through the waveguide 35 in the direction perpendicular to the side surface 354 (in Z-axis direction). By extending the effective distribution range of the seeping light 60, the propagative edge 360, which is the coupled portion where coupling occurs in a surface plasmon mode, and therefore the entire surface plasmon generator 36 in the present embodiment, can be reliably placed in the effective distribution range of the seeping light 60. Here, letting the extent (length) of the effective distribution range of the seeping light 60 from the interface (side surface 354) in Z-axis direction be a seeping length (penetration length) $d_{EV}$, then the following relational expression holds:

$$d_{EV} \geq T_{NF} \quad (1)$$

where $T_{NF}$ is the thickness $T_{NF}$ of the surface plasmon generator 36 (in Z-axis direction), that is, the distance between the propagative edge 360 and the contact-to-waveguide surface 361. Since the surface plasmon generator 36 is placed in the effective distribution range of seeping light 60, the seeping light 60 can be coupled with fluctuations in charge excited in the propagative edge 360 of the surface plasmon generator 36 that is at the farthest distance from the interface (side surface 354). Consequently, a surface plasmon mode is induced in the propagative edge 360 on which surface plasmon is to propagate and thus surface plasmon can be sufficiently excited. That is, surface plasmon can be reliably excited in the propagative edge 360 which is located on the side opposite to the waveguide 35. Since the propagative edge 360 is the sharp verge of surface plasmon generator 36 where electric field is more likely to concentrate, surface plasmon is intrinsically easily excited. The length $L_{BF}$ of the surface plasmon generator 36 (the contact-to-waveguide surface 361) which is in contact with the upper surface (side surface) 354 of the waveguide 35 is also one of the important parameters in induction of the surface plasmon mode. In the configuration using a Kretschmann configuration, an optical design is made to make the frequency of waveguide light equal to the resonant frequency of surface plasmon with consideration given to the influence of the induction of the surface plasmon mode on the wavenumber K of laser light (waveguide light) propagating through the waveguide 35.

Backing to FIG. 6a, the excited surface plasmon 61 propagates along on the propagative edge 360 in the direction shown by arrow 62. The destination of propagative edge 360 is the vertex NFP of the NFL-generating end surface 36a, then the surface plasmon 61 propagating on the edge 360, namely, electric field converges at the vertex NFP. As a result, NF-light 63 is emitted from the vertex NFP. The NF-light 63 is radiated toward the magnetic recording layer of the magnetic disk 10, and reaches the surface of the magnetic disk 10 to heat a portion of the magnetic recording layer of the disk 10. This heating reduces the anisotropic magnetic field (coercive force) of the portion to a value with which write operation can be performed. Immediately after the heating, write field 64 generated from the main magnetic pole 3400 is applied to the portion to perform write operation. Thus, the thermally-assisted magnetic recording can be achieved.

In the formation of the present invention utilizing the Kretschmann configuration in which the waveguide 35 and the surface plasmon generator 36 have a surface contact with each other, any buffering portion does not lies between the upper surface (side surface) 354 of the waveguide 35 and the contact-to-waveguide surface 361. As a result, the amount of surface plasmon that is excited on the contact-to-waveguide surface 361 and propagates on the surface 361 is significantly reduced due to the lack of certain optical boundary condition. Therefore, the intensity of NF-light is drastically reduced at the position of the edge 361a on the NFL-generating end surface 36a, especially at the positions of both ends of the edge 361a. That is, the NF-light 63 can be generated more intensively at the vertex NFP that is on the main magnetic pole 3400 side.

Further, in the thermally-assisted magnetic recording according to the present invention, a surface plasmon mode is used, and NF-light 63 is generated by propagating surface plasmon 61 toward the head end surface 2210. This brings the temperature at the NFL-generating end surface 36a to, for example, about 100° C. during the emission of NF-light, the temperature being drastically reduced compared to the case that a plasmon antenna made of a metal piece is used to generate NF-light. Thus, this reduction of temperature allows the protrusion of the NFL-generating end surface 36a toward the magnetic disk 10 to be suppressed; thereby favorable thermally-assisted magnetic recording can be achieved. Here, the induction of a surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), U.S. Pat. Nos. 7,330,404 B2, and 7,454,095 B2.

Figure 7A:
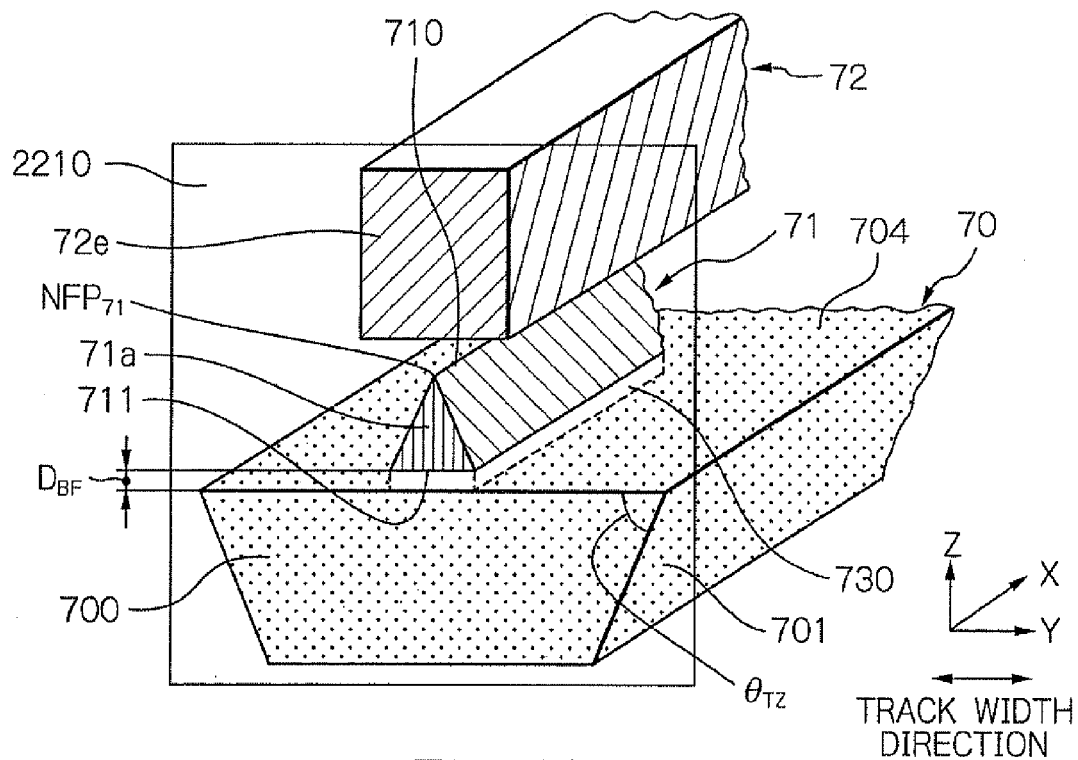
FIGS. 7a and 7b show schematic views illustrating another embodiment of the NFL-generating optical system and the main magnetic pole according to the present invention.
Figure 7B:
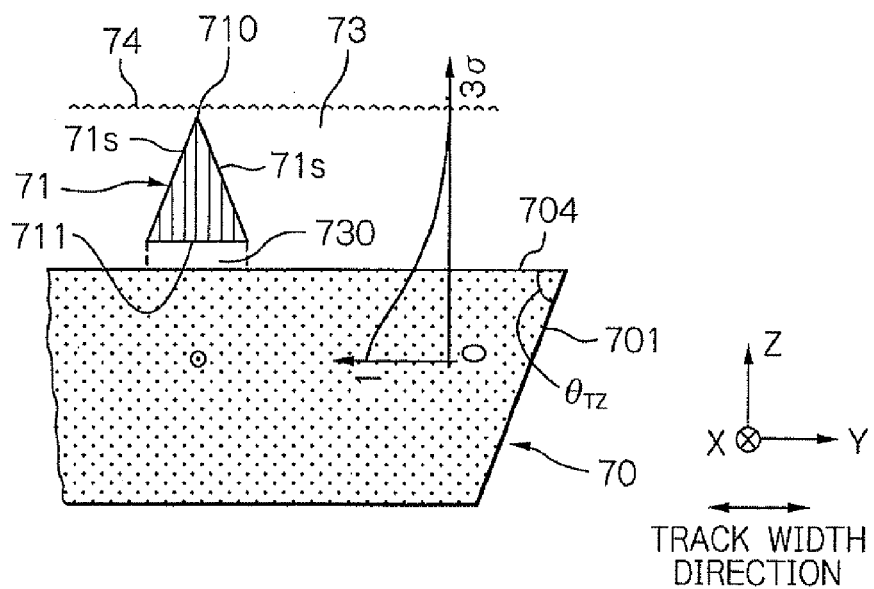

FIGS. 7a and 7b show schematic views illustrating another embodiment of the NFL-generating optical system and the main magnetic pole according to the present invention. FIG. 7a is a perspective view in which the head end surface 2210 is at the front, and FIG. 7b is a cross-sectional view taken by YZ-plane.

As shown in FIG. 7a, a waveguide 70, a surface plasmon generator 71, and a main magnetic pole 72 are identical in configuration to the waveguide 35, the surface plasmon generator 36 and the main magnetic pole 3400 illustrated in FIGS. 4 and 5, except that the waveguide 70 and the surface plasmon generator 71 are at a distance from each other. An opposed-to-waveguide surface 711 of the surface plasmon generator 71 faces the upper surface (side surface) 704 of the waveguide 70 at a predetermined distance $D_{BF}$ from the upper surface 704. In the configuration in FIG. 7a, the waveguide 70, an insulating layer portion 730 provided between the waveguide 70 and the surface plasmon generator 71, and the surface plasmon generator 71 are arranged in an Otto configuration which is one configuration of optical system that uses evanescent light to excite surface plasmon. The Otto configuration is a configuration in which a first dielectric region, a second dielectric region that has a refractive index lower than that of the first dielectric region, and a metal region are sequentially disposed from the side of the incidence of laser light, any neighboring regions having a contact with each other. The principles of exciting surface plasmon by utilizing this Otto configuration and the Kretschmann configuration shown in FIGS. 4 and 5 are different from each other. As a result, these configurations realize optical formations different from each other, and provide dispersion relations of surface plasmon different from each other. The Otto configuration is explained in detail, for example, in Otto, "Excitation of Nonradiative Surface Plasma Waves in Silver by the Method of Frustrated Total Reflection", Zeitschrift fur Physik Vol. 216, pp 398-410 (1968).

In the embodiment shown in FIG. 7a, the laser light (waveguide light), which has advanced to near the opposed-to-waveguide surface 71 of the surface plasmon generator 71, is coupled with the optical configuration including the waveguide 70 with a refractive index $n_{WG}$, the buffering portion (insulating layer portion 730 and insulating layer 73 (FIG. 7b) that covers the generator 71) with a refractive index $n_{OC}$ ($n_{OC} < n_{WG}$), and the surface plasmon generator 71 made of a conductive material such as a metal, and induces a surface plasmon mode in the surface plasmon generator 71. That is, seeping light 74 (FIG. 7b) from the waveguide 70 is coupled with the fluctuation of electric charge excited on the surface of the generator 71, which induces a surface plasmon mode, and thus surface plasmon is excited.

Here, in the cross-sectional view shown in FIG. 7b, a YZ cross-section of the waveguide 70 has substantially a shape of isosceles trapezoid whose longer side is on the surface plasmon generator 71 side. Here, the longer side (side surface 704) located on the surface plasmon generator 71 side and the adjacent side (side surface 701) form an acute angle $\theta_{TZ}$, which is preferably equal to or more than 45° and equal to or less than 89.5°, as will be described later. By setting such a cross-section of the waveguide 70, the effective distribution range of seeping light 74 can be extended from the interface (side surface 704) in the +Z direction as will be described later. Consequently, a coupled portion of the surface plasmon generator 71 where coupling occurs in a surface plasmon mode can be placed well within the effective distribution range of seeping light 74. Here, the coupled portion can include a portion of the opposed-to-waveguide surface (bottom surface) 711 and a portion of a side surface 71s of the surface plasmon generator 71, depending on the shape and size of the surface plasmon generator 71. Surface plasmon excited at the opposed-to-waveguide surface 711 and the side surface 71s also induce a surface plasmon mode in a propagative edge 710 which has the smallest acute angle while the excited surface plasmon travels in the direction toward the NFL-generating end surface 71a (in −X direction). Therefore, in this case, the propagative edge 710 does not necessarily need to be placed in the effective distribution range of seeping light 74. However, the propagative edge 710 to which surface plasmon is to propagate is more preferably placed in the effective distribution range of seeping light 74 as the coupled portion in which coupling occurs in the surface plasmon mode. In that case, the entire surface plasmon generator 71 is placed in the effective distribution range of seeping light 74. In the present embodiment, surface plasmon thus excited propagates through the propagative edge 710 to the NFL-generating end surface 71a. As a result, NF-light is generated in a concentrated manner from the vertex $NFP_{71}$ on the end surface 72e side of the main magnetic pole 72.

Since the formation using the Otto configuration in the present embodiment includes the insulating layer portion 730 as a buffering portion between the waveguide 70 and the surface plasmon generator 71, surface plasmon can be excited without exerting a significant influence on the wavenumber K of laser light (waveguide light) propagating through the waveguide 70. Consequently, the coupling of waveguide light with surface plasmon can be easily kept at a high level. The intensity of the coupling between the waveguide 70 and the surface plasmon generator 71 in the surface plasmon mode strongly depends on the distance $D_{BF}$ between the waveguide 70 and the surface plasmon generator 71. Therefore, the distance $D_{BF}$ is set to a predetermined value with minimum variations.

In the embodiment illustrated in FIGS. 7a and 7b, the inverted trapezoidal shape of cross-section of the waveguide 70 sufficiently enables the coupled portion (the propagative edge 710) of the surface plasmon generator 71 where coupling occurs in a surface plasmon mode to be placed in the effective propagation range of seeping light 74. Consequently, surface plasmon can be excited in the propagative edge 710 of the surface plasmon generator 71 that is located on the side opposite to the waveguide 70, and the surface plasmon can be propagated on the propagative edge 710 in a concentrated manner. Accordingly, NF-light can be generated in a concentrated manner in a minute region near the main magnetic pole 72 provided on the side opposite to the waveguide 70 as viewed from the surface plasmon generator 71. As a result, good thermally-assisted magnetic recording can be accomplished.

Figure 8A:
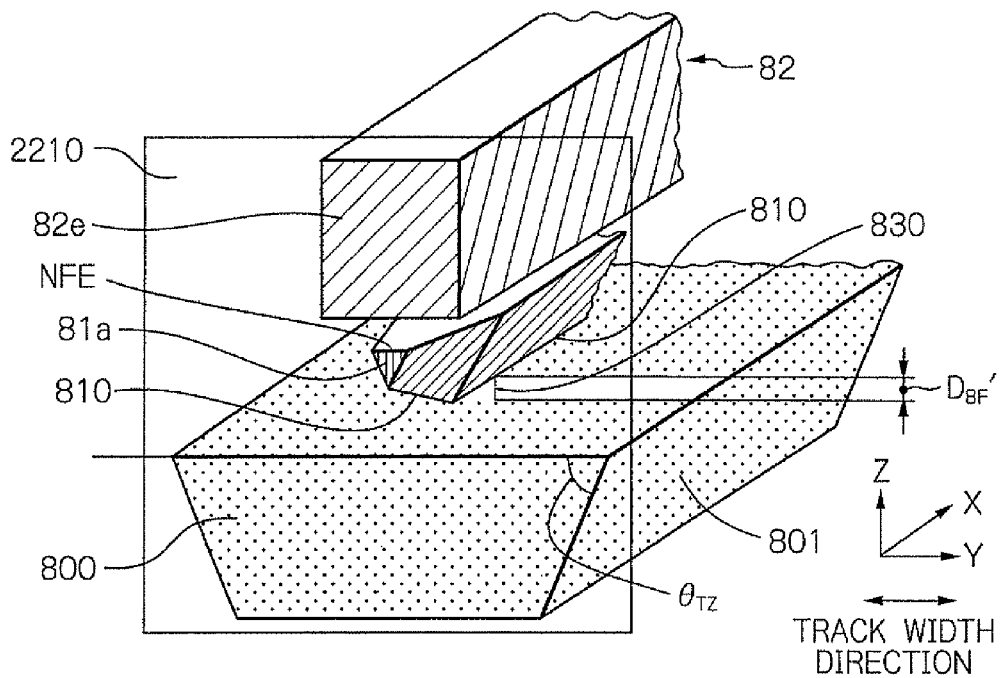
FIGS. 8a and 8b show schematic views illustrating further another embodiment of a NFL-generating optical system and a main magnetic pole according to the present invention.
Figure 8B:
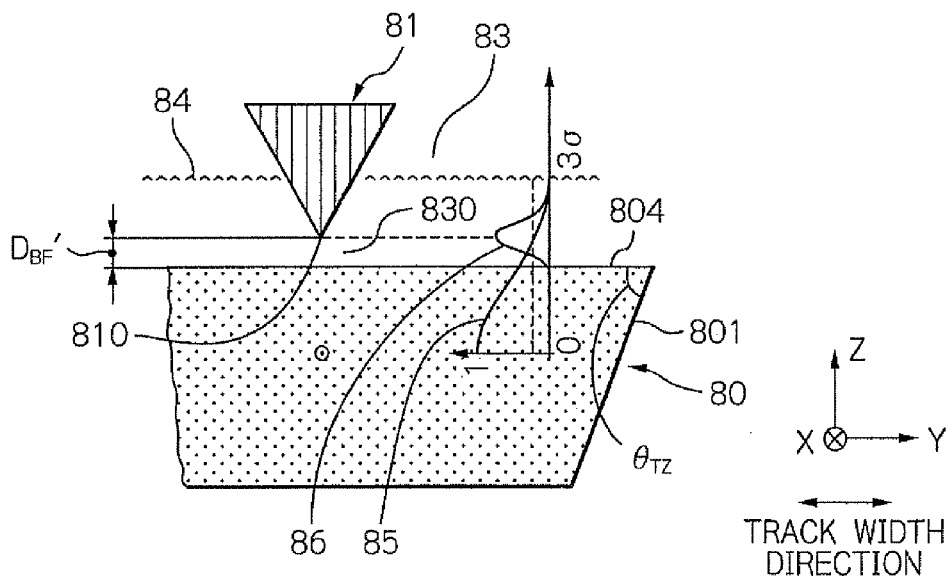

FIGS. 8a and 8b show schematic views illustrating further another embodiment of a NFL-generating optical system and a main magnetic pole according to the present invention. FIG.

8a is a perspective view in which a head end surface 2210 is at the front, and FIG. 8b is a cross-sectional view taken by YZ-plane.

As shown in FIG. 8a, a waveguide 80, a surface plasmon generator 81 and a main magnetic pole 82 are identical in configuration to the waveguide 35, the surface plasmon generator 36 and the main magnetic pole 3400 illustrated in FIGS. 4 and 5 except that the waveguide 80 and the surface plasmon generator 81 are at a distance from each other and the surface plasmon generator 81 has a different shape. Here, the surface plasmon generator 81 includes a propagative edge 810 for propagating surface plasmon excited by waveguide light, the propagative edge 810 facing the upper surface (side surface) 804 of the waveguide 80 with a predetermined distance $D_{BF}'$ and extending to a NFL=generating end surface 81a.

In the configuration in FIG. 8a, the waveguide 80, an insulating layer portion 830 provided between the waveguide 80 and the surface plasmon generator 81, and the surface plasmon generator 81 are arranged in an Otto configuration as in the embodiment shown in FIGS. 7a and 7b. Laser light (waveguide light) that has traveled close to the propagative edge 810 of the surface plasmon generator 81 couples to the optical arrangement including the waveguide 80 having a refractive index of $N_{WG}$, a buffering portion (the insulating layer portion 830 and an insulating layer 83 (FIG. 8b) which covers the generator 81) having a refractive index of $n_{OC}$ (where $n_{OC} < n_{WG}$), and the surface plasmon generator 81 made of a conductive material such as metal, thereby inducing a surface plasmon mode in the propagative edge 810 of the surface plasmon generator 81. That is, seeping light 84 (FIG. 8b) from the waveguide 80 couples with fluctuations in charge excited in the surface of the surface plasmon generator 81, especially, in the propagative edge 810 which is closest to the waveguide 80 and forms a verge that allows electric fields to readily concentrate, to the propagative edge 810, thereby inducing a surface plasmon mode to excite surface plasmon on the propagative edge 810.

In the cross-sectional view shown in FIG. 8b, a YZ cross-section of the waveguide 80 has substantially the shape of an isosceles trapezoid whose longer side is on the surface plasmon generator 81 side. Here, the longer side (side surface 804) which is on the surface plasmon generator 81 side and the adjacent side (side surface 801) form an acute angle $\theta_{TZ}$, which is preferably equal to or more than 45° and equal to or more than 89.5°, as will be described later. By setting such a cross-section of the waveguide 80, the effective distribution range of seeping light 84 can be extended from the interface (side surface 804) in +Z direction, as will be described later. Consequently, the propagative edge 810, which is a coupled portion of the surface plasmon generator 81 where the generator 81 is coupled in a surface plasmon mode, can be placed well within the effective distribution range of seeping light 84. In this case, the excited surface plasmon propagates through the propagative edge 810 to the NFL-generating end surface 81a. By adjusting the shape and size of the NFL-generating end surface 81a, NF-light can be generated in a concentrated manner from the edge NFE on the side of the end surface 82 of the main magnetic pole 82.

In the embodiment shown in FIG. 8b, the entire surface plasmon generator 81 does not necessarily need to be placed within the effective distribution range of seeping light 84. NF-light having an energy distribution 86 with a peak at the position of the propagative edge 810 in Z-axis direction can be generated as long as the propagative edge 810 is in the effective distribution range of seeping light 84, that is, in the range of 3σ of the energy distribution 85 of the seeping light.

As has been described above, in the embodiment shown in FIGS. 8a and 8b, the inverted trapezoidal shape of cross-section of the waveguide 80 sufficiently enables the propagative edge 810 (the entire surface plasmon generator 81), which is the coupled portion where the generator 81 is coupled in a surface plasmon mode, to be placed in the effective distribution range of seeping light 84. Consequently, surface plasmon can be excited and propagated on the propagative edge 810 of the surface plasmon generator 81 in a concentrated manner. Accordingly, NF=light can be generated in a concentrated manner in a small region near the main magnetic pole 82 provided on the side opposite to the waveguide 80 as viewed from the surface plasmon generator 81. As a result, good thermally-assisted magnetic recording can be accomplished.

Hereinafter, practical examples will be given in which a simulation was conducted to analyze the effective distribution range of light seeping from a waveguide having a trapezoidal cross-section according to the present invention and the NF-light output power from a surface plasmon generator.

Figure 9A:
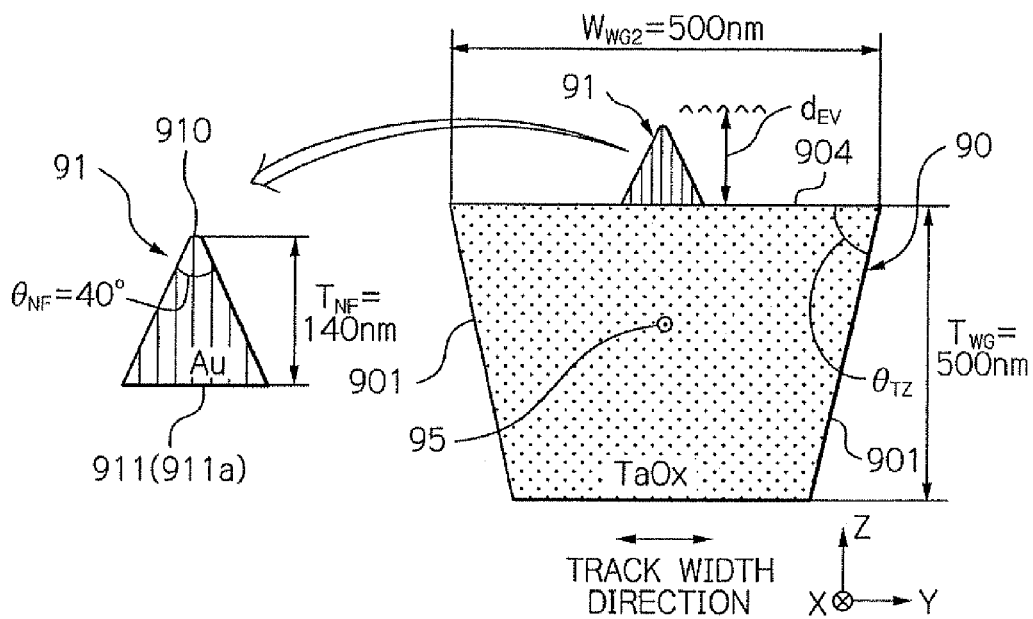
FIG. 9a shows a cross-sectional view of an experimental system used in simulations for studying the seeping length $D_{EV}$ of light seeping from a waveguide.

FIG. 9a shows a cross-sectional view of an experimental system used in simulations for studying the seeping length $D_{EV}$ of light seeping from a waveguide.

As shown in FIG. 9a, first in the present example, an analytical simulation experiment using a three-dimensional Finite-Difference Time-Domain (FDTD) method, which is an electromagnetic field analysis technique, was conducted to calculate the effective distribution range of light that seeps from a waveguide 90, that is, the seeping length $D_{EV}$ (in Z-axis direction) of light seeping from the upper surface (side surface) 904 of the waveguide 90.

Laser light incident to the waveguide 90 was a Gaussian beam with a wavelength $\lambda_L$ of 825 nm and TM polarization (the oscillation direction of electric field of the laser light is perpendicular to the upper surface 904, that is, in Z-axis direction). The intensity $I_{IN}$ of the laser light was 1.0 $(V/m)^2$. The seeping length $D_{EV}$ was equal to the extent (length) of the effective distribution range of light seeping from the waveguide 90, in Z-axis direction from the upper surface 904, as has been described with respect to FIG. 6b. The width $W_{WG2}$ of the waveguide 90 in the track width direction on the upper surface 904 was 500 nm, and the thickness $T_{WG}$ (in Z-axis direction) was also 500 nm. The waveguide 90 had an isosceles-trapezoidal YZ cross-section. The angle $\theta_{TZ}$ formed by the upper surface 904 and the side surface 901 was changed in the range from 45 degrees (°) to 100°.

The contact-to-waveguide surface 911 of the surface plasmon generator 91 had a surface contact with the upper surface 904 of the waveguide 90. The surface plasmon generator 91 was placed on the upper surface 904 and at the center of the upper surface 904 in the track width direction (in Y-axis direction). The vertex angle $\theta_{NF}$ of the surface plasmon generator 81 (in Z-axis direction) was 40°, and the thickness $T_{NF}$ of the surface plasmon generator 81 was 140 nm. The thickness $T_{NF}$ was determined in such a way that the wavenumber of the surface plasmon generator 91 became equal to the wavenumber of waveguide light propagating through the waveguide 90. The waveguide 90 was made of TaO$_X$ (with a refractive index $N_{WG}$ of 2.15) and the surface plasmon generator 91 was made of Au. Here, Au had a refractive index with a real part of 0.223 and an imaginary part of 5.080. The waveguide 90 and the surface plasmon generator 91 were covered with Al$_2$O$_3$ (alumina with a refractive index $n_{OC}$ of 1.65) which acts as a buffering portion and a clad.

Figure 9B:
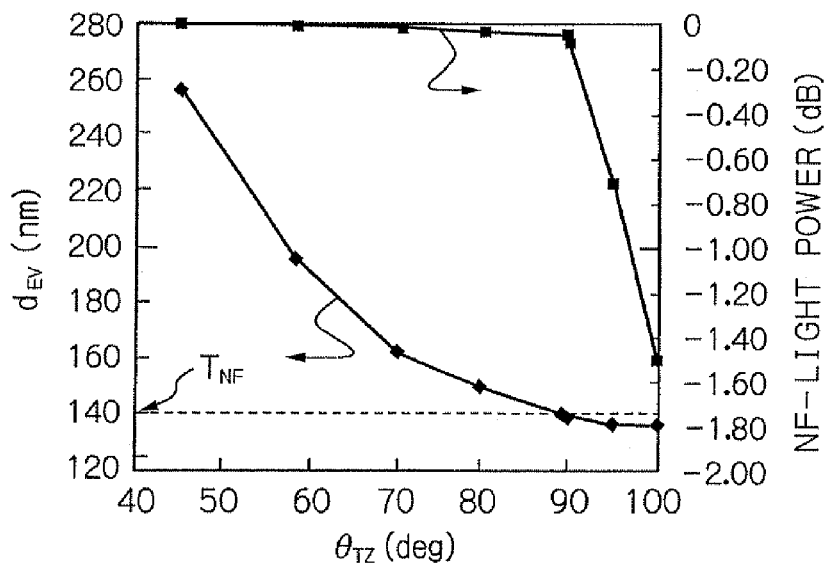
FIG. 9b shows a graph illustrating the relationship between the cross sectional shape (angle$\theta_{TZ}$) of the waveguide, seeping length $D_{EV}$ and NF-light output which is calculated on the basis of the results of the simulation experiment.

Table 1 illustrates the relationship between the cross-sectional shape (angle $\theta_{TZ}$) of the waveguide 90 and the seeping length $d_{EV}$ and NF-light output from the surface plasmon generator 91, which was calculated with the simulation described above. FIG. 9b shows a graph illustrating the results of the simulation experiment that are given in Table 1. The NF-light output values shown in Table 1 and FIG. 9b were values in dB (decibel) at the NFL-generating end surface of the surface plasmon generator 91, normalized on the basis of the output value (0 dB) for an angle $\theta_{TZ}$ of 45°.

TABLE 1

| Angle $\theta_{TZ}$ (°) | Seeping length $d_{EV}$ (nm) | NF-light output (dB) |
|---|---|---|
| 45 | 256 | 0 |
| 58 | 196 | −0.01 |
| 70 | 162.5 | −0.02 |
| 80 | 150.5 | −0.03 |
| 89.5 | 140 | −0.04 |
| 90 | 139.5 | −0.08 |
| 95 | 137.2 | −0.71 |
| 100 | 136.5 | −1.50 |

As can be seen from Table 1 and FIG. 9b, if the angle $\theta_{TZ}$ formed by the upper surface 904 and the side surface 901 of the waveguide 90 is less than 90°, that is, if the cross-section has the shape of an inverted trapezoid, the seeping length $d_{EV}$ is greater than or equal to the value $T_{NF}$ (140 nm) which was set in such a way that the wavenumber of the surface plasmon generator became equal to the wavenumber of waveguide light propagating through the waveguide, and the effective distribution range of seeping light extends at least to the propagative edge 910 and includes the surface plasmon generator 91. The seeping length $d_{EV}$ increases as the angle $\theta_{TZ}$ is set to be smaller. The seeping length $d_{EV}$ reaches 256 nm at angle $\theta_{TZ}$=45°. On the other hand, if angle $\theta_{TZ} \geq 90°$, that is, if the cross-sectional shape is rectangular (or square) or regular-trapezoidal, the seeping length $d_{EV}$ is less than the value $T_{NF}$ (140 nm), and the surface plasmon generator 91 (the propagative edge 910) lies outside the effective distribution range of seeping light.

If the angle $\theta_{TZ}$ is equal to or more than 45° and equal to or less than 89.5°, the NF-light output power stably remains at a high value in the range of 0 to −0.04 dB with respect to the standard value (0 dB) at angle $\theta_{TZ}$=45° (inverted trapezoid), and is approximately 1.5 dB higher than the value at angle $\theta_{TZ}$=100° (regular trapezoid). The high output values demonstrate that the light use efficiency, which is the ratio of the intensity of NF-light to the intensity of incident laser light, is improved.

The above-described results show that it is preferable that the angle $\theta_{TZ}$ is less than 90° ($\theta_{TZ}$<90°) in order to reliably extend the effective distribution range of seeping light to (the propagative edge 910 of) the surface plasmon generator 91. In other words, it can be understood that it is preferable that a YZ cross-section of the waveguide 90 is inverted-trapezoidal in shape. It is also understood that it is preferable that the angle $\theta_{TZ}$ is equal to, or more than 45° and equal to or less than 89.5° in order to obtain stable high output of NF-light or high light use efficiency.

As can be seen from the foregoing, according to the present invention, light seeping from the waveguide can be caused to well reach a desired portion (a coupled portion where coupling occurs in a surface plasmon mode) of the surface plasmon generator. As a result, the light use efficiency of the NFL-generating optical system including the waveguide and the surface plasmon generator can be improved. With this, a magnetic recording medium can be irradiated with NF-light having a sufficient intensity, and therefore thermally-assisted magnetic recording in which a write location can be adequately heated can be accomplished.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thermally-assisted magnetic recording head comprising:
   a magnetic pole for generating write field from its end surface on an opposed-to-medium surface side;
   a waveguide through which a light for exciting surface plasmon propagates; and
   a near-field optical device configured to be coupled with the light in a surface plasmon mode and to emit near-field light from its near-field-light-generating end surface that forms a portion of the opposed-to-medium surface and is located adjacent to the end surface of the magnetic pole on the opposed-to-medium surface side,
   a cross-section of the waveguide having substantially a shape of a trapezoid in which a longer side of opposed sides parallel to each other is an edge of the cross-section on the near-field optical device side, in at least a portion of the waveguide that is opposed to or has a contact with the near-field optical device, the cross-section being taken by a plane perpendicular to an edge of the waveguide along its elongated direction.

2. The thermally-assisted magnetic recording head as claimed in claim 1, wherein the cross-section of the waveguide has substantially a shape of an isosceles trapezoid, and the longer side and a side adjacent to the longer side form a acute angle.

3. The thermally-assisted magnetic recording head as claimed in claim 2, wherein the angle formed between the longer side and the adjacent side is equal to or more than 45 degrees and is equal to or less than 89.5 degrees.

4. The thermally-assisted magnetic recording head as claimed in claim 1, wherein a portion of the near-field optical device which is coupled with the light in a surface plasmon mode is located in an effective distribution range of a light seeping from the waveguide.

5. The thermally-assisted magnetic recording head as claimed in claim 1, wherein the near-field optical device comprises: a contact-to-waveguide surface having a surface contact with the waveguide; and a propagative edge for propagating surface plasmon excited by the light, located on an opposite side to the contact-to-waveguide surface in the near-field optical device and extending to the near-field-light-generating end surface, at least a portion of the propagative edge being located in an effective distribution range of a light seeping from the waveguide as a portion coupled with the light in a surface plasmon mode.

6. The thermally-assisted magnetic recording head as claimed in claim 1, wherein the near-field optical device comprises: an opposed-to-waveguide surface opposed to the waveguide with a predetermined distance; and a propagative edge for propagating surface plasmon excited by the light, located on an opposite side to the opposed-to-waveguide surface in the near-field optical device and extending to the near-field-light-generating end surface, at least a portion of the propagative edge being located in an effective distribution range of a light seeping from the waveguide as a portion coupled with the light in a surface plasmon mode.

7. The thermally-assisted magnetic recording head as claimed in claim 1, wherein the near-field optical device comprises a propagative edge for propagating surface plasmon excited by the light, opposed to the waveguide with a predetermined distance and extending to the near-field-light-generating end surface, at least a portion of the propagative edge being located in an effective distribution range of a light seeping from the waveguide as a portion coupled with the light in a surface plasmon mode.

8. The thermally-assisted magnetic recording head as claimed in claim 1, wherein the near-field optical device is provided between the waveguide and the magnetic pole.

9. The thermally-assisted magnetic recording head as claimed in claim 1, wherein the near-field optical device is covered with a material having a refractive index lower than a refractive index of a constituent material of the waveguide.

10. The thermally-assisted magnetic recording head as claimed in claim 1, wherein a magnetic shield is provided on an opposite side to the magnetic pole when viewed from the near-field optical device.

11. A head gimbal assembly comprising: a thermally-assisted magnetic recording head as claimed in claim 1; and a suspension supporting the thermally-assisted magnetic recording head.

12. A magnetic recording apparatus comprising:
at least one head gimbal assembly comprising a thermally-assisted magnetic recording head and a suspension supporting the thermally-assisted magnetic recording head;
at least one magnetic recording medium; and
a recording circuit configured to control write operations that the thermally-assisted magnetic recording head performs to the at least one magnetic recording medium,
the thermally-assisted magnetic recording head comprising:
a magnetic pole for generating write field from its end surface on an opposed-to-medium surface side;
a waveguide through which a light for exciting surface plasmon propagates; and
a near-field optical device configured to be coupled with the light in a surface plasmon mode and to emit near-field light from its near-field-light-generating end surface that forms a portion of the opposed-to-medium surface and is located adjacent to the end surface of the magnetic pole on the opposed-to-medium surface side,
a cross-section of the waveguide having substantially a shape of a trapezoid in which a longer side of opposed sides parallel to each other is an edge of the cross-section on the near-field optical device side, in at least a portion of the waveguide that is opposed to or has a contact with the near-field optical device, the cross-section being taken by a plane perpendicular to an edge of the waveguide along its elongated direction, and
the recording circuit further comprising a light-emission control circuit configured to control operations of a light source that generates the light for exciting surface plasmon.

* * * * *